US012217211B1

(12) United States Patent
Bellamy et al.

(10) Patent No.: US 12,217,211 B1
(45) Date of Patent: Feb. 4, 2025

(54) SYSTEMS AND METHODS FOR AUTOMATED MODIFICATION OF DELIVERY PARAMETERS

(71) Applicant: Amazon Technologies, Inc., Seattle, WA (US)

(72) Inventors: Matthew Kenneth Bellamy, Kirkland, WA (US); Manoj Nibhoria, Bellevue, WA (US); Brian Michael Rock, Austin, TX (US); Charlton Wong, Toronto (CA); Mohammad Reza Shakouri, Austin, TX (US); Christopher William Canal, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/066,704

(22) Filed: Dec. 15, 2022

(51) Int. Cl.
*G06Q 10/0835* (2023.01)
*G06N 20/00* (2019.01)

(52) U.S. Cl.
CPC ....... *G06Q 10/08355* (2013.01); *G06N 20/00* (2019.01)

(58) Field of Classification Search
CPC .................. G06Q 10/08355; G06Q 50/40
USPC ........................................................ 705/338
See application file for complete search history.

(56) References Cited

U.S. PATENT DOCUMENTS

| 2004/0002983 | A1* | 1/2004 | Ashida | ................... | G06F 16/283 |
| 2011/0153373 | A1* | 6/2011 | Dantzig | ................ | G06Q 10/02 |
| | | | | | 705/5 |
| 2012/0047225 | A1* | 2/2012 | Kunitake | ................ | G06Q 10/06 |
| | | | | | 709/217 |
| 2016/0224935 | A1* | 8/2016 | Burnett | .............. | G06Q 10/0834 |
| 2018/0121875 | A1* | 5/2018 | Satyanarayana Rao | ..................... | |
| | | | | | G06Q 10/08355 |
| 2023/0267121 | A1* | 8/2023 | Li | ......................... | G06F 16/221 |
| | | | | | 707/803 |

FOREIGN PATENT DOCUMENTS

WO    WO-2021211538 A1 * 10/2021 ............ G06F 16/211

OTHER PUBLICATIONS

S. Maddodi, G. V. Attigeri and A. K. Karunakar, "Data Deduplication Techniques and Analysis," 2010 3rd International Conference on Emerging Trends in Engineering and Technology, Goa, India, 2010, pp. 664-668. (Year: 2010).*

* cited by examiner

*Primary Examiner* — Jeff Zimmerman
*Assistant Examiner* — Hunter A Molnar
(74) *Attorney, Agent, or Firm* — Eversheds Sutherland (US) LLP

(57) ABSTRACT

Systems and methods are provided for automated modification of delivery parameters. Particularly, computing model that is trained to determine a probability that a delivery defect is likely to occur for a given delivery or set of deliveries. Based on the probability, various limitations associated with the deliveries may be activated or deactivated on a mobile device application used by a delivery driver to perform the deliveries. The systems and methods reduce the number of delivery defects that occur while simultaneously reducing the use of unnecessary guardrails for low-risk deliveries. The model may be queried in real-time such that guardrails for a delivery itinerary may be optimized prior to the delivery driver beginning the delivery route.

16 Claims, 17 Drawing Sheets

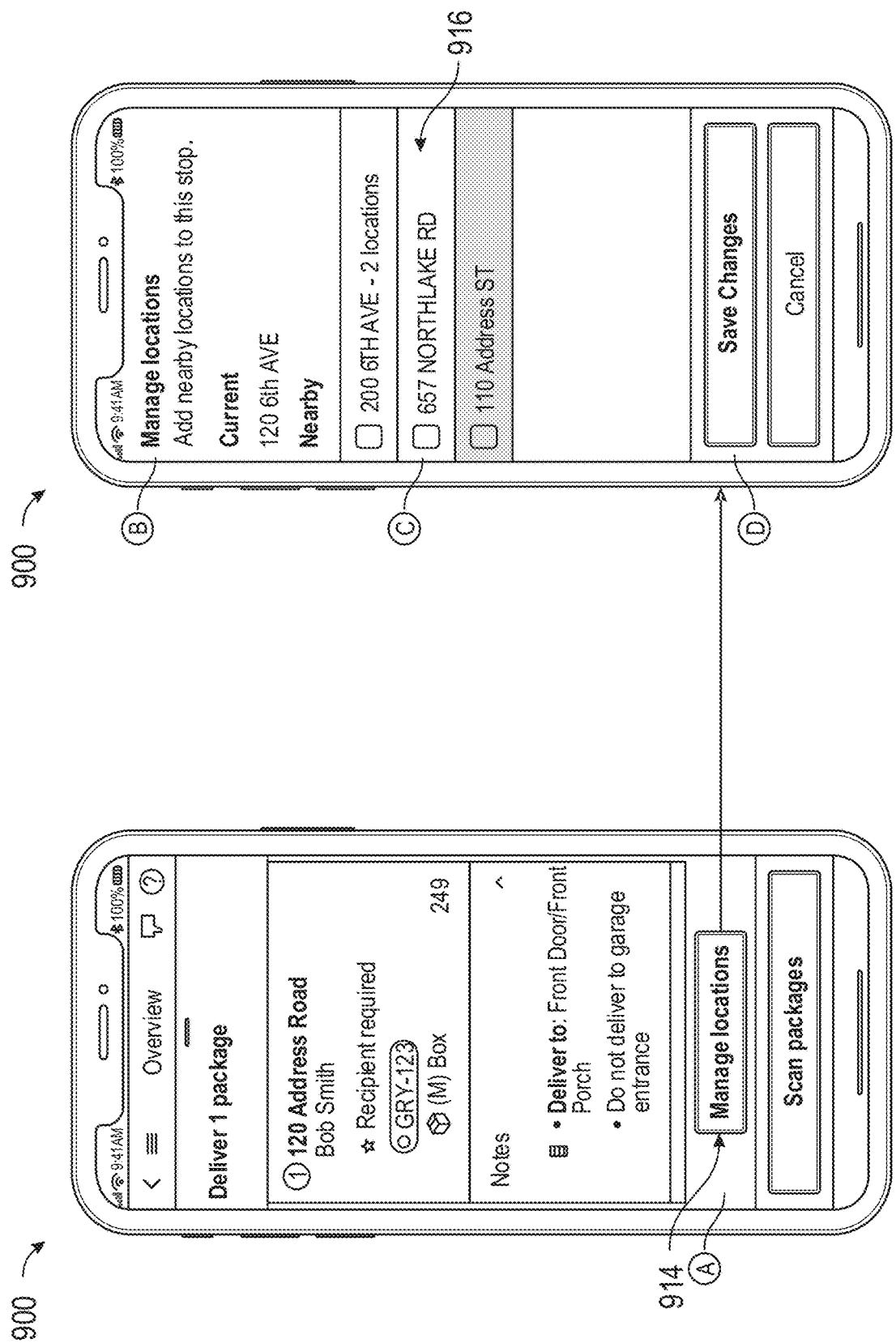

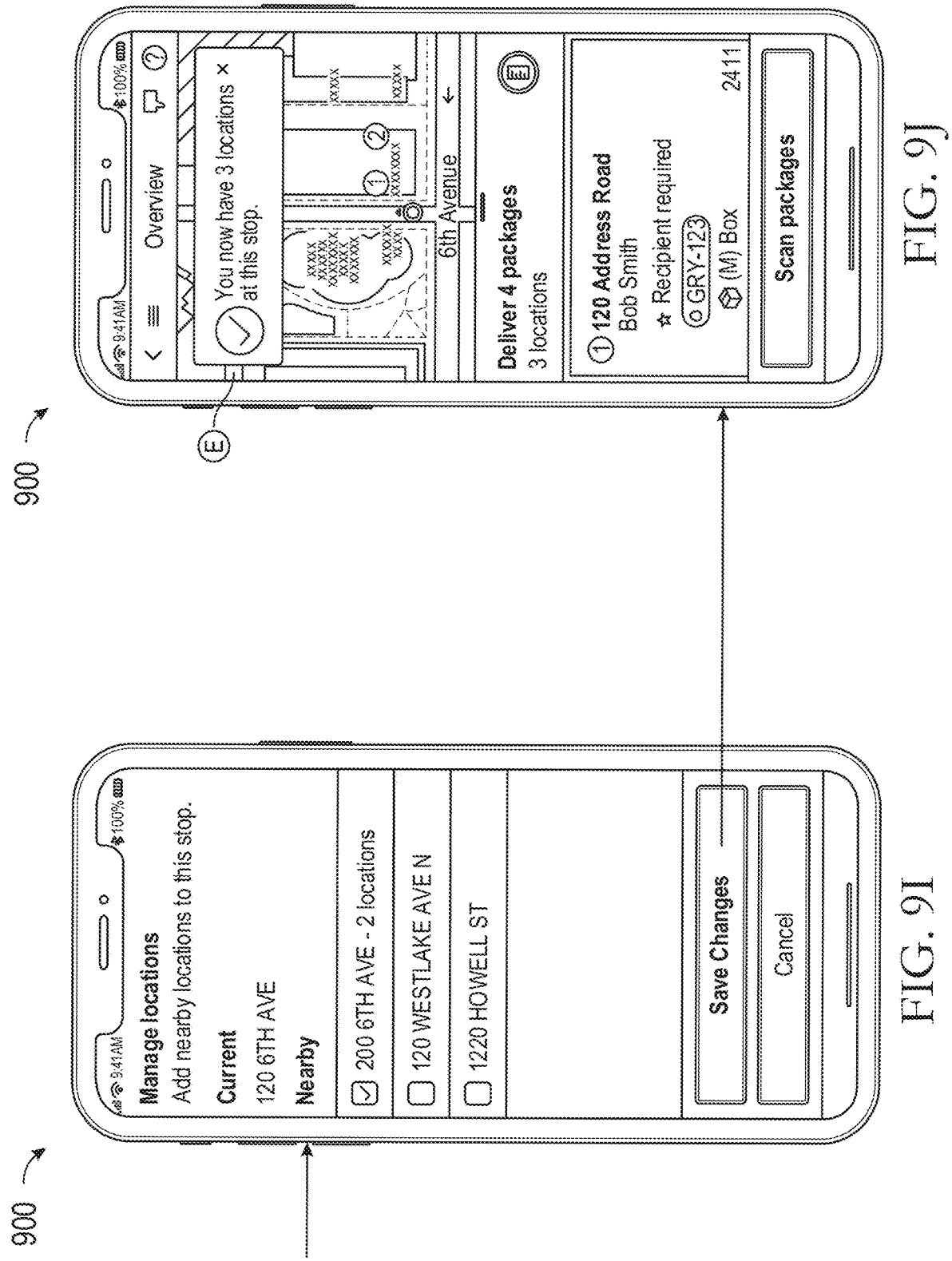

SYSTEMS AND METHODS FOR AUTOMATED MODIFICATION OF DELIVERY PARAMETERS

BACKGROUND

Oftentimes, mobile device applications are used by delivery drivers to facilitate a set of deliveries. Such applications may include different delivery "guardrails" that provide limitations or additional requirements on the set of deliveries to prevent a delivery defect from occurring. For example, the application may require the delivery driver to obtain a customer signature for a delivery in order to indicate that the delivery was completed through the application. However, these applications may not effectively manage which guardrails should be applied to a given delivery and/or delivery driver (or if any guardrails should be used at all). In some instances, no guardrails are implemented for a delivery, which may increase the risk that a delivery defect will occur. Even if certain guardrails are implemented, these guardrails may be insufficient and still result in a delivery defect. While one potential solution involves providing additional guardrails to mitigate these delivery defects, scenarios may arise where superfluous guardrails are implemented, which may result in inefficient delivery routes for the delivery driver.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 9A-9K illustrate an example user interface in accordance with one or more example embodiments of the disclosure.

DETAILED DESCRIPTION

Figure 1:
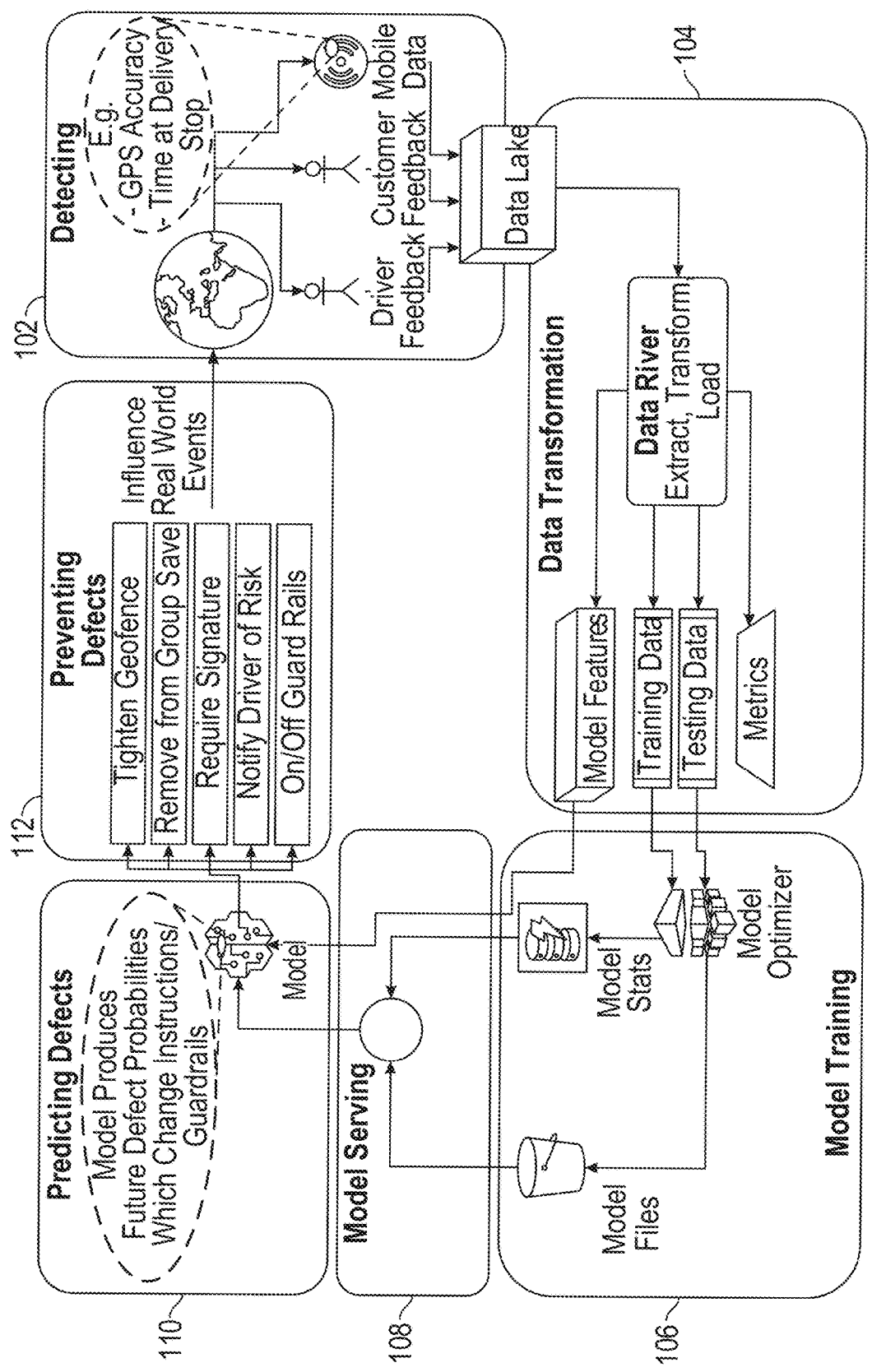
FIG. 1 illustrates an example flow diagram for automated modification of delivery parameters in accordance with one or more example embodiments of the disclosure.

This disclosure relates to, among other things, devices, systems, methods, computer-readable media, techniques, and methodologies for automated modification of delivery parameters (the term "parameters" may be used interchangeably herein with "limitations," "guardrails," etc.). Particularly, a computing model (which may be interchangeably referred to as a "model," a "prediction model," and the like herein) may be employed to improve overall delivery quality by mitigating the likelihood of delivery defects while also reducing unnecessary restrictions for delivery drivers when a delivery defect is unlikely to occur for a given delivery. A delivery defect may refer to any scenario in which a delivery is not successfully completed as expected. Non-limiting examples of delivery defects may include a package being indicated as delivered but not actually received by the customer, a package being delivered to an incorrect address, or a delivery being performed in a manner that does on adhere to an indicated customer preference (for example, specific delivery location specified by the customer), etc.

In one or more embodiments, the model may be a supervised machine learning model, such as a decision tree or a random forest algorithm (however, any other type of model may also be used). The model may be configured to receive a delivery itinerary associated with a delivery driver and may produce an output including a probability value indicating a likelihood that a delivery defect (reference hereinafter to a single "delivery defect" may similarly apply to multiple delivery defects as well) may occur.

Based on this probability value provided by the model, the application may adjust certain delivery parameters associated with the particular delivery driver and the delivery itinerary. For example, if the delivery driver previously had delivery issues at a specific address, and the itinerary includes the same address, then the application may activate a "guardrail" to reduce the likelihood of a delivery defect occurring. Some examples of guardrails may include requiring the delivery driver to submit proof of a customer signature for a package through the application, using a geofence to track whether the delivery driver delivered the package to the correct location at the delivery address, etc. Additional examples of guardrails are described herein as well. Conversely, if the delivery driver has delivered multiple times to the address in the past without any delivery defects, the application may deactivate the guardrail for the delivery driver for subsequent deliveries at the address. These are just two examples of triggering conditions for activating and/or deactivating certain guardrails, and any other triggering conditions may also be possible as well.

Two examples of guardrails that may be activated within an application are illustrated in FIGS. 9A-9K.

The determination as to whether a particular guardrail should be activated within the application for a given delivery may be based on a comparison between the probability value output by the model and a threshold value established for the given guardrail. Additionally, multiple guardrails may exist and the individual guardrails may be associated with unique threshold values (however, some of the threshold values for different guardrails may be the same as well). The threshold values for the different guardrails may be established based on any number of different factors. For example, a higher threshold value may be established for a guardrail that is more likely to have a greater impact on the efficiency of the deliveries performed by the delivery driver. The use of this model in this manner enables a more effective balance between mitigating the number of delivery defects while also maximizing delivery efficiency.

Turning to the figures, FIG. 1 illustrates an example flow diagram 100 for automated modification of delivery parameters in accordance with one or more example embodiments of the disclosure. The flow diagram 100 may include a detecting stage 102, a data transformation stage 104, a model training stage 106, a model serving stage 108, a defect prediction stage 110, and a preventing defect stage 112.

The detecting stage 102 may involve operations associated with the logging and storage of any number of different types of data that may be used to train the model (for example, in the model training stage 106) and/or that may be provided to the model as inputs in real-time to determine a probability that one or more delivery defects may occur for a given set of deliveries (for example, in the predicting defects stage 110). High-level examples of such data may include data from a mobile device (which may also be referred to herein as a "user device") used by a delivery driver to perform a delivery (including information provided by an application on the mobile device used by the delivery driver to perform the deliveries), driver feedback, customer feedback, etc. In one or more embodiments, the data may specifically include delivery driver information, delivery address information, customer information (e.g., the customer who purchased the item for delivery), seller information (e.g., the individual or entity from which the customer purchased the item), package information, and/or any other types of data. Examples of these different types of data types are provided below.

Examples of delivery driver information may include driver concession and infraction history (for example, indications of package mishandling, indications of failures to adhere to delivery instructions, property damage, etc.), driver experience (for example, difficulty of previous delivery routes for the delivery driver), a number of delivery anomalies associated with the delivery driver (for example, number of incomplete package cycles, number of rushed routes, number of safety events, package delivered photographs taken, etc.), a number of deliveries performed in an "offline" application mode, timing of deliveries performed, driver device information (for example, battery level, GPS strength, device type, etc.), and/or any other types of data.

Examples of address information may include a delivery failure history for an address (for example, prior indications of an inability to locate the address, no secure delivery location, an inaccessible delivery location, a missing or incorrect access code, etc.), basic address information and address type, transit and service time at addresses, network connectivity, customer infraction or complaint history, an indication whether an address is a new address (for example, a first delivery associated with the address), address density (for example, a number of addresses within the same region), an accuracy of GPS signals at the address, a history of crime associated with the address, a property size, a property value, etc.

Examples of customer information may include positive and negative review counts, information relating to concession claims generated by the customer (for example, a number of claims, number of verified and refunded claims, a number of disputed and fraud claims), an indication of whether the customer is a new customer, an indication of whether the customer typically has special delivery requests and delivery feedback history. An example of seller information may include package mishandling history (for example, indications that a package was mishandled by the seller). Examples of package information may include package value, package dimensions, package weight, whether a package includes perishable items, an indication of whether a package includes hazardous materials, etc. Other types of data may include real time weather information, information about a delivery vehicle used to perform the deliveries, time of day, and/or any other types of information. Any of the aforementioned data is merely exemplary and is not intended to be limiting in any way.

Any of this data (as well as any other types of data not mentioned herein) may be obtained from any number of different types of data sources. For example, any of the data may be stored in a database, such as the one or more databases 230 shown in FIG. 2 and/or any other databases described herein or otherwise. The data that is stored in the database may be accessed by the model when a query is made for the model to determine the probability that a delivery may result in a delivery defect. The data that is stored within the database may be obtained from any number of different types of systems, devices, etc. For example, user devices associated with the delivery drivers and/or the customers, delivery vehicles, and/or any other data sources.

The data transformation stage 104 involves transforming the data obtained in the detection stage 102 into a standard format that may be used for model training and real-time model querying. In one or more embodiments, this stage of the process 100 may be triggered periodically (for example, daily or any other time period), but the final data stores produced by this stage (for example, the transformed data that is stored in the database) may be queried once per delivery (or set of deliveries), for example. That is, data may periodically or continuously be obtained for purposes of training the prediction model. However, once the data is transformed into a standardized format, it may be stored for future use by the prediction model. The stored data may then be retrieved on demand to assist the prediction model to output a probability that one or more delivery defects may occur for a delivery or set of deliveries prior to the delivery driver undertaking the delivery or set of deliveries. An example of a data transformation is provided in FIGS. 4A-4B.

Figure 5:
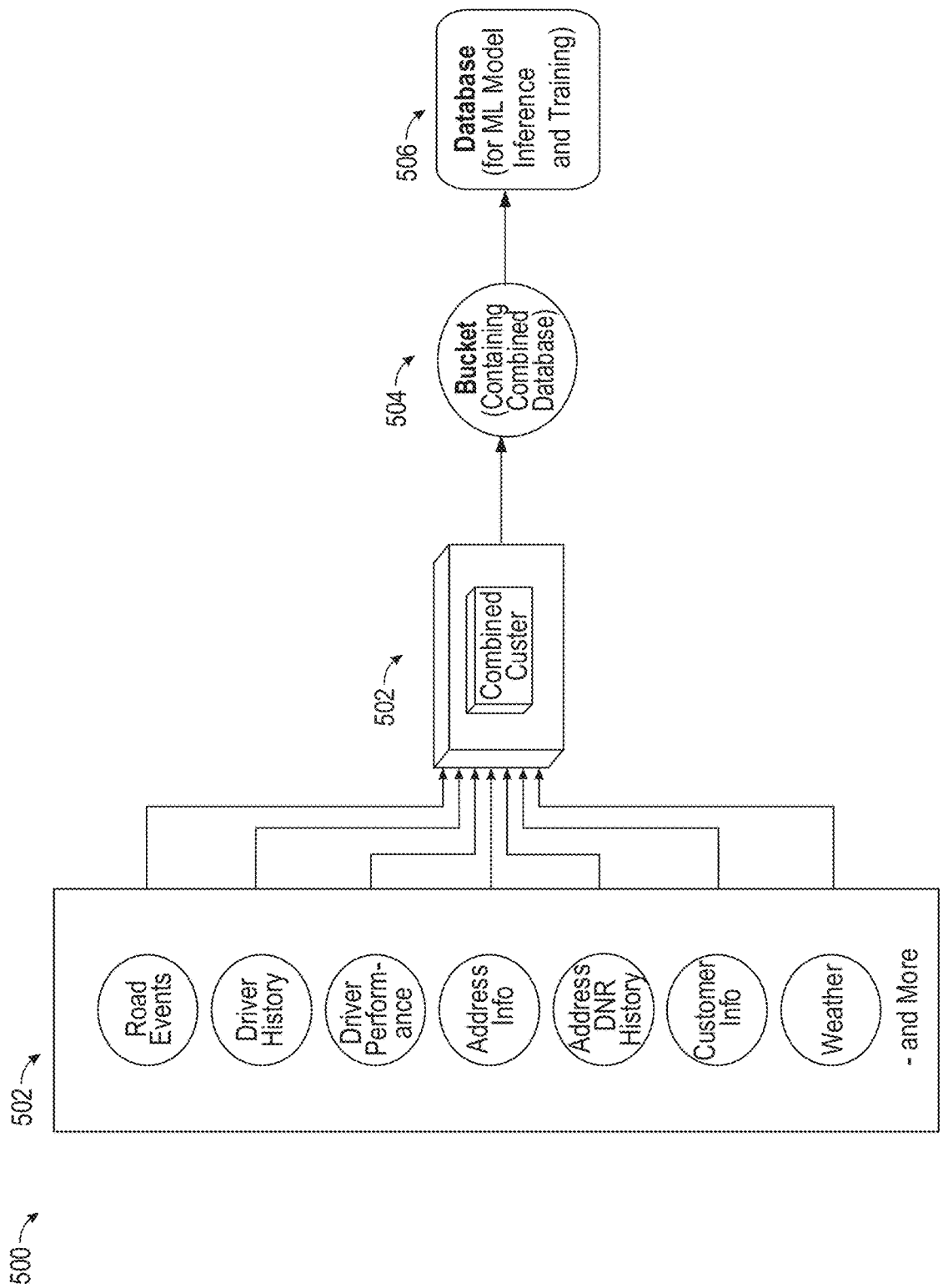
FIG. 5 illustrates an example flow diagram for a data transformation stage in accordance with one or more example embodiments of the disclosure.

In one or more embodiments, the data transformation stage 104 may be split into two portions. A first portion of the data transformation stage 104 is shown in FIG. 5 and includes gathering the raw data (for example, which may be in the form of multiple data tables) and combining the raw data into a consolidated data collection (for example, a single data table). In one or more embodiments, the first portion may also including storing a JabaScript Object Notation (JSON) output. Writing to the JSON format after the tables have been combined may allow the schema to remain flexible (for example, new tables may be added to the tables ad hoc), and may also allow the data to subsequently be written into one or more databases. However, any other format may also be used. Since the data sources may have been combined into a single table, the combined dataset can then be partitioned and stored. Storing the data in this manner may also allow for the retention of snapshots of this data for future reference and/or analysis, such as when the model training occurs, for example.

TABLE 1

| employee_id | LONGEST_STOP_LAST_6_MONTHS_address_stop_time_seconds | AVERAGE_TIME_LAST_6MONTHS_address_stop_time_seconds | STD_DEVIA-TION_LAST_6MONTHS_address_stop_time_seconds | PERCENTAGE_OF_DELIVERIES_DRIVER_tried_outside_geofence_IN_LAST_6MONTHS | TOTAL_concession_cost_LAST_6_MONTHS | address_id | city | Resulted_in_DNR |
|---|---|---|---|---|---|---|---|---|
| 31 | 60 | 31 | 40 | 50% | $301.42 | 100 | Houston | YES |
| 32 | 3 | 3 | 0 | 0% | $102.21 | 101 | Austin | YES |
| 33 | 10 | 9 | 0.8 | 50% | $0 | 102 | Waco | NO |

With the combined dataset in JSON format, the second portion (shown in FIG. 6) may involve transforming the data into feature tables and making the feature tables readily available for querying by the model. The data may need to be transformed because after gathering all relevant historical data, the combined dataset may have a fixed number of features, but an unknown number of historical examples. Although predictions may be made from varying amounts of data, most prediction algorithms may require a fixed input data size. Consequentially, information may be extracted from potentially hundreds of rows of data in history tables to create a fixed-size numeric set of data that represents the histories and package information. A model may learn and make real-time predictions (e.g., output a probability value) more effectively with this distilled information.

Following the data transformation stage 104, the model training stage 106 may involve using distilled data from the data transformation stage 104 to train and evaluate the prediction model. In one or more embodiments, machine learning may be used to produce the model. However, this is not intended to be limiting and the model may be produced in any other manner as well.

In some cases, the model may also be trained using a delayed time scale. Due to the nature of time series data, a date limit may be used for training datasets and testing datasets. For example, if the date is Dec. 30, 2021, not all of the deliveries for the past year may necessarily be used to influence a prediction. This may be because a most recent week of data has a good chance of being inaccurate as the delivered but not received (DNR) or other defects have not registered yet, and therefore, they may appear the same as in the data as deliveries that have gone correctly. However, the data that is used does not need to be limited in this way and the model may also be trained using any data originating from any time as well.

When evaluating the prediction model, it may also be important that the training and sampling data does not include any information that may cause an inaccurate evaluation of the model. This may be mitigated or prevented by segmenting the data by time period when compared to the date that the evaluation is occurring. For that reason, in testing, the data may be segmented into three sections relative to the current date (for example, stats sampling data, training data, and testing data). The last column, "Resulted_in_DNR" may be the column that the model may learn for prediction purposes in this example. Some or all of the other columns may be feature columns that may have some correlation with DNR.

In one or more embodiments, the model may employ a decision tree (for example, as shown in FIG. 7). The decision tree may be trained by determining which features in the table best split the data into two groups: one with a more significant number of delivery defects and one with fewer delivery defects. Following this split, the same process may be performed with the resulting two sub-groups using the decision tree (and this process may be iterated through the remainder of the decision tree. However, any other type of model may also be used as well.

The model serving task 108 may involve determining a particular data format to provide to a model based on the type of device on which the model is hosted. That is, different types of devices, including different types of hardware, may process different types of data files. For example, a mobile device, such as a smartphone, may use a Java file, but a neural network hosted on a different type of device may use a different type of file.

The defect prediction stage 110 may involve leveraging the model trained through the model training stage 106 to predict the likelihood that a delivery defect may occur during a given delivery or set of deliveries. The input to the model may be information about an upcoming delivery or deliveries (for example, addresses, the specific delivery driver performing the deliveries, and/or any other types of information). The model may then query the one or more databases, including historical information about the address, delivery driver, environment, and other factors that may impact a delivery defect. This information from the one or more databases may then be used by the model to output a probability of a delivery defect occurring during the delivery or deliveries.

The model may not necessarily be limited to just outputting a single probability value providing a general indication of a likelihood that a delivery defect may occur. The model may also output a probability value for each individual type of delivery defect as well. As an additional non-limiting example, the model may also provide any other form of output other than a probability value, such as a Boolean value simply indicating whether a delivery defect may occur or will not occur.

The preventing defects stage 112 may involve activating or deactivating one or more guardrails for each of the deliveries based on the output of the model in the predicting defects stage 110. As aforementioned, the guardrails may include various types of limitations that may be placed on a delivery or deliveries. Specifically, the guardrails may modify the functionality of an application used by the delivery driver to perform the delivery or deliveries. Thus, activating a guardrail, for example, may add a requirement to the application for performing a delivery or deliveries or may prevent the delivery driver from accessing certain functionality of the application for the delivery or deliveries. Turning on the guardrail may potentially reduce the efficiency of the delivery but may also mitigate the likelihood that a delivery defect will occur during the delivery or deliveries. Conversely, turning of the guardrail may remove these limitations and allow for the delivery driver to perform a more efficient delivery, which may be desirable if a delivery defect is unlikely to occur during the particular delivery or deliveries. Three non-limiting example guardrails are provided below. However, any other type of guardrail may also be used (or not used).

A first example of a guardrail may include preventing geofence circumvention in an offline mode of the application. In some instances, when a driver is faced with geofence, the delivery driver may bypass the geofence by transitioning the application into an offline mode (for example, removing network connectivity associated with the application). The guardrail serves to prevent this occurrence by using a geofence to verify offline deliveries.

As an example of deactivating a guardrail to improve delivery efficiency, the geofence guardrail may be turned off for an address and/or delivery driver that is associated with a low probability of a delivery defect. This may provide more flexibility to the delivery driver in performing the delivery, which may allow the delivery driver to perform the delivery quicker than if the guardrail were turned on.

A second example guardrail may involve scenarios when a verification photograph of the package at the delivery location that is taken by the delivery driver does not match with historical photographs of similar deliveries at the same delivery location. In such scenarios, the guardrail may either require the delivery driver to place the package in the correct location and re-verify the correct location using a subsequent photograph or may require the delivery driver to indicate in the application why the photograph does not appear to match the historical photographs.

A third example guardrail may include excluding deliveries associated with a high risk of a delivery defect from a group delivery option. In group deliveries, multiple packages associated with different customer orders may be delivered together to a common location, such as an apartment mail room. The guardrail may prevent high-risk deliveries from being added to a group delivery and may require the delivery driver to separately perform the high-risk delivery.

In one or more embodiments, each individual guardrail may be associated with a threshold value. To determine if a given guardrail should be activated or deactivated for a particular delivery or deliveries, the probability value output by the model may be automatically compared to the different thresholds. If the probability value satisfies the threshold value for a particular guardrail, then that guardrail may be activated. If the probability value does not satisfy the threshold value for that particular guardrail, then the guardrail may be deactivated. The phrase "satisfying a threshold" as used herein may include any of being greater than, greater than or equal to, equal to, less than or equal to, or less than the threshold value. Different guardrails may be associated with different threshold values, so any given probability value may not necessarily satisfy or not satisfy all of the guardrails in the same way. The determination as to whether any of the guardrails should be activated or deactivated may be performed by the mobile device application or a remote system.

The different threshold values associated with the different guardrails may either be manually set by a user or may be automatically set by a computing system or device. The threshold values associated with each type of guardrail may be selected based on any number of different factors. In some cases, the threshold values may be selected based on the impact a particular guardrail may have on delivery efficiency. For example, a guardrail that is more likely to have a significant impact on delivery efficiency may be associated with a higher threshold value such that the guardrail is activated when the likelihood of a delivery defect occurring is high.

In one or more embodiments, the threshold values may also be automatically tuned to further optimize the deliveries. A feedback loop may be established such that data associated with a delivery may be used to determine whether any of the threshold values for the different guardrails need to be raised or lowered. This feedback loop may be based on any number of different types of data, such as customer feedback, delivery driver feedback, indications as to whether delivery defects actually did occur, etc. For example, a maximum range of the threshold values may be between 0 and 1 and a first threshold value associated with an example guardrail may originally be set to a value of 0.2 (which may be a low threshold value). Given this low threshold value, the likelihood that the guardrail will be applied to any given delivery may be relatively high. However, if the feedback data from the delivery drivers indicates a significant decrease in delivery efficiency when the guardrail is activated relative to other types of guardrails. Based on this information, the threshold value may automatically be increased to reduce the likelihood that the guardrail may be activated. If the number of delivery defects does not increase or only increased by a negligible amount, then the threshold value may remain the increased value. This is merely one example of a manner in which the thresholds may automatically be tuned and the thresholds may be modified based on any number of other types of factors.

Figure 2:
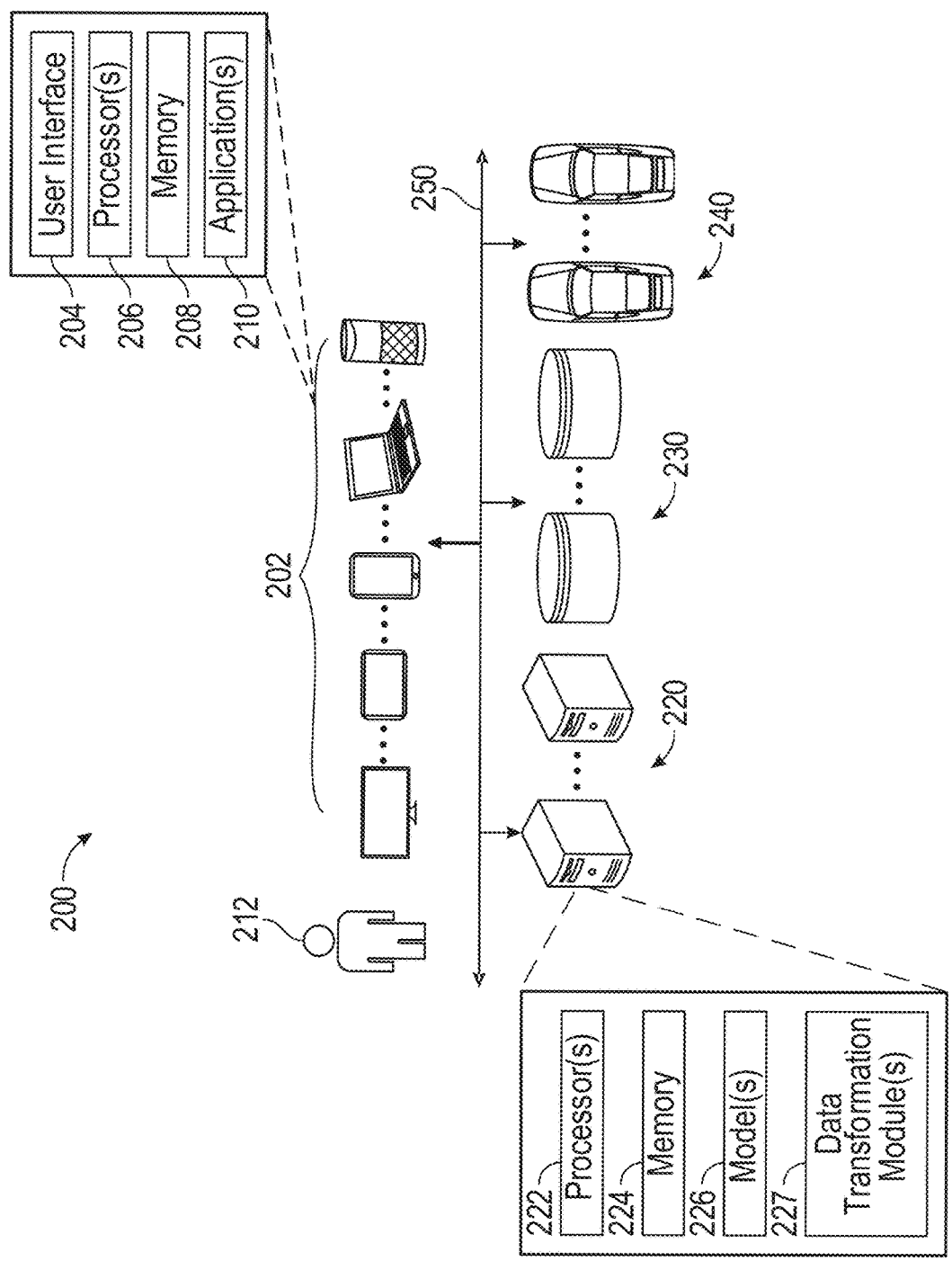
FIG. 2 is an illustration of an example system in accordance with one or more example embodiments of the disclosure.

FIG. 2 is an illustration of an example system 200 in accordance with one or more example embodiments of the disclosure. In one or more embodiments, the system 200 may include at least one or more user devices 202, one or more servers 220, one or more databases 230, and/or one or more delivery vehicles 240. However, these elements of the system 200 are merely exemplary and are not intended to be limiting in any way. For simplicity, reference may be made hereinafter to a "user device 202," a "server 220," a "database 230," and "a vehicle 240," however, this is not intended to be limiting and may still refer to any number of such elements.

The user device 202 may be any type of device (for example, a desktop or laptop computer, tablet, smartphone, and/or any other type of device) that is used by a user 212 to facilitate one or more deliveries. In some cases, the user 212 may be a delivery driver, and the mobile device may include an application 210. The application 210 may be a package routing and delivery application that may be used by the user 212 to perform one or more deliveries associated with a delivery route for the delivery driver (for example, using a delivery vehicle 240). For example, the application 210 may include an itinerary of packages for the delivery driver to deliver along a delivery route for a day, including delivery addresses associated with the deliveries. The application 210 may also present the delivery route to the user, provide delivery instructions to the delivery driver, and/or provide any other functionality associated with the deliveries performed by the delivery driver. The user 212 may be able to interact with the application 210 through the user interface 204 (which may be the same as, or similar to, user interface 900).

The application 210 may, depending on the output of the prediction model, automatically activate or deactivate various guardrails (examples of such guardrails are described elsewhere herein) for some or all of the deliveries included in the delivery itinerary. In some cases, the application 210 itself may not necessarily make the determinations as to which guardrails should be activated or deactivated, but rather may receive an indication of which guardrails to activate or deactivate for a given delivery from an external source (such as the server 220 and/or any other system or device, for example). Example illustrations of the application and some of the guardrails are shown in FIGS. 9A-9K. Any of the guardrails may be activated or deactivated by the application on an individual delivery level (for example, adjustments may be made to the guardrails for each individual delivery). However, the guardrails may also be modified for a group of deliveries as well. In some cases, the guardrails may be established for a full delivery itinerary and may remain fixed for all of the deliveries included in the itinerary. The user device 202 may also include one or more processors 206 and memory 208.

The server 220 may be a local or remote system that is used to perform any of the processing described herein (for example, server 220 may host any of the model(s) described herein and/or may perform any of the operations described herein relating to producing a probability that a delivery defect may occur for a set of deliveries and/or any other processes described herein or otherwise). The model may also be provided within any other component of the system 200, such as the user device 202, the vehicle 240, etc. The server 220 may also include one or more processors 222 and memory 224. The server 220 may also include any number of different software modules used to perform any of the operations described herein, such as a data transformation module 227 (which may perform operations associated with the data transformation stage 104, etc.), as well any other modules used to perform any of the steps in FIG. 1 as well.

The database 230 may include any storage medium that may be used to store any of the date described herein or otherwise. For example, the database 230 may store delivery driver data, customer data, seller data, address data, package data, environmental data, and/or any other types of data. The database 230 may be queried by the model 226 (and/or any other model) to determine a probability that a delivery defect may occur for a given delivery or deliveries.

The vehicle 230 may include any type of vehicle (for example, electric vehicle, hybrid vehicle, internal combustion engine vehicle, autonomous or semi-autonomous vehicle, etc.). Specifically, the vehicle 240 may be a delivery vehicle used by the user 212 to perform any of the deliveries described herein or otherwise. In some instances, the application 210 may be associated with a vehicle-specific device or system, such as an infotainment system of the vehicle 240 or a device that is installed in the vehicle 240 (for example, a tablet, etc.). The vehicle 240 may also be configured to perform any of the processing that may be performed by the server 220 and/or the user device 202 as well. For example, the vehicle 240 itself may house a model used to determine the delivery defect predictions.

In one or more embodiments, any of the elements of the system 200 (for example, the user device 202, the server 220, the database 230, the vehicle 240, and/or any other element described with respect to FIG. 2 or otherwise) may be configured to communicate via a communications network 250. Examples of communication networks are further described with respect to FIG. 13. Finally, any of the elements of the system 200 may include any of the elements of the computing device 1100 as well.

Figure 3:
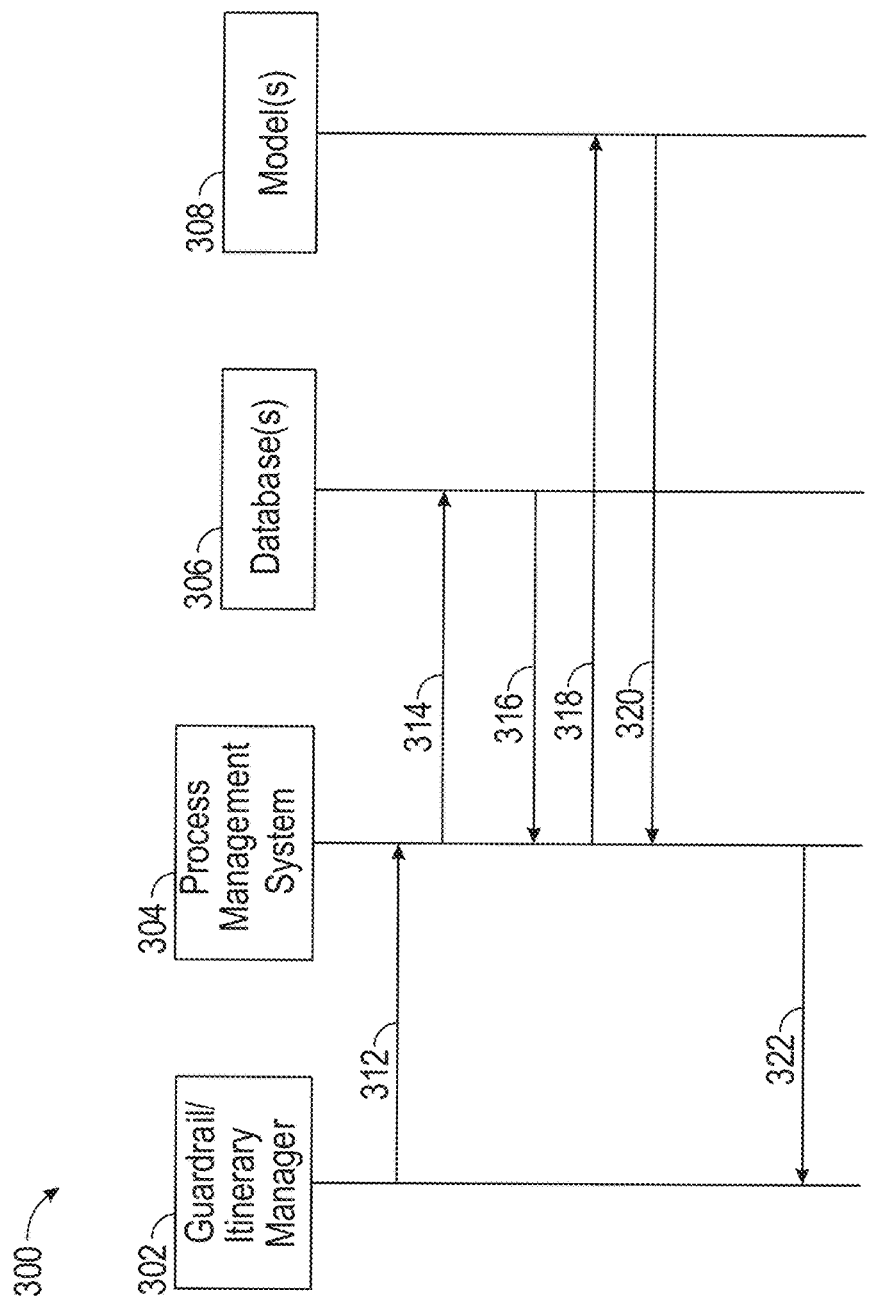
FIG. 3 illustrates another example flow diagram for automated modification of delivery parameters in accordance with one or more example embodiments of the disclosure.

FIG. 3 illustrates another example flow diagram 300 for automated modification of delivery parameters in accordance with one or more example embodiments of the disclosure. In one or more embodiments, the flow diagram 300 may involve operations performed between a guardrail and itinerary manage system 302, a process management system 304 (which may be the same as, or similar to, the process management module in FIG. 8), a database 306, and a model 308. In some embodiments, the guardrail and itinerary manager 302 and the process management system 304 may be consolidated into a single system that may perform any of the same processes.

The flow diagram 300 illustrates that once the model 308 is trained using historical data, the model 308 may then be queried in real-time. Specifically, the model 308 may be queried prior to a delivery or deliveries being performed to determine a probability that a delivery defect will occur with the delivery or deliveries. That is, multiple delivery itineraries for a given day associated with different delivery drivers may be provided to the model 308, and the model 308 may be trained to provide the outputs in real-time for each of the itineraries. In one or more embodiments, the model 308 may be trained to produce the outputs within a second or a few seconds. Thus, once a delivery itinerary is determined for a delivery driver, the itinerary may be automatically provided to the model. The model may determine the probability value, which may then be compared to the various thresholds associated with the different guardrails. Based on this comparison, different guardrails may automatically either be activated or deactivated within the application used by the delivery driver to perform the deliveries associated with the delivery itinerary.

Operation 312 involves the guardrail and itinerary management system 302 providing a delivery itinerary to the process management system 304 to determine a probability of one or more delivery defects occurring for the deliveries included within the delivery itinerary. A delivery itinerary may include, for example, information associated with one or more delivery routes to be performed by a delivery driver within a given time period (for example, a set of deliveries to be performed by the delivery driver in a day). The itinerary may include any information that is relevant to the deliveries, such as delivery addresses, package types and contents, and/or any other types of information.

Operations 314 and 316 requesting data from the database 306 and receiving the requested data from the database 306. The data that is received from the database 306 may include any other types of data that may be relevant to the model 308 to produce the probability that one or more delivery defects may occur during the deliveries associated with the itinerary. For example, the data may include historical data associated with the particular delivery driver, data associated with the addresses included in the itinerary, customer data, seller data, package data, environmental data, and/or any other data described herein (these types of data were previously discussed with respect to FIG. 1).

Operation 318 involves providing the data received from the database 306 to the model 308 as an input. Operation 320 may involve the model 308 producing an output including one or more probabilities that one or more delivery defects are likely to occur. Operation 322 involves providing the probability value to the guardrail/itinerary manager 302.

Based on the probability value, one or more guardrails of the application may be activated or deactivated.

Figure 4A:
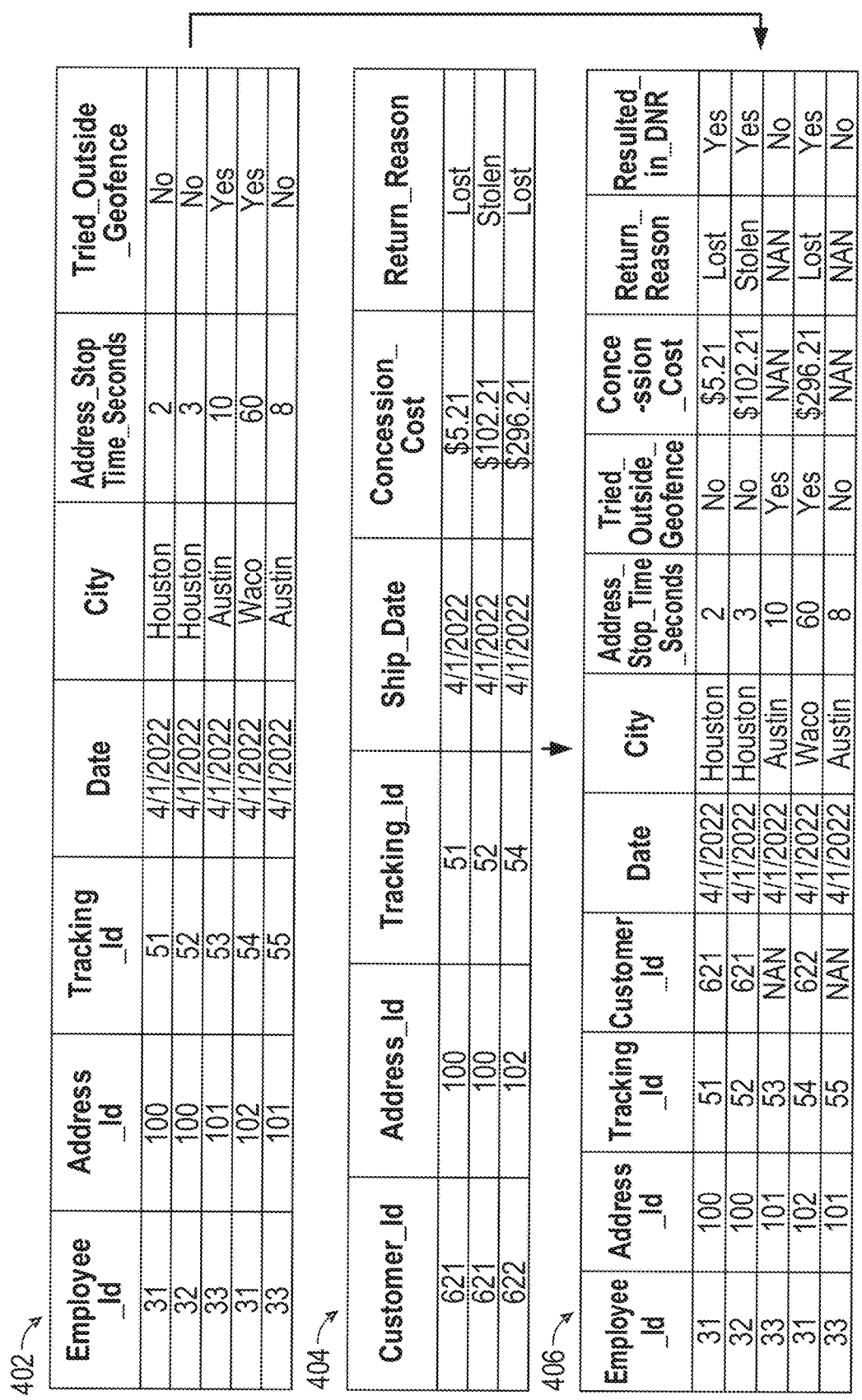
FIGS. 4A-4B illustrates an example data transformation process in accordance with one or more example embodiments of the disclosure.
Figure 4B:
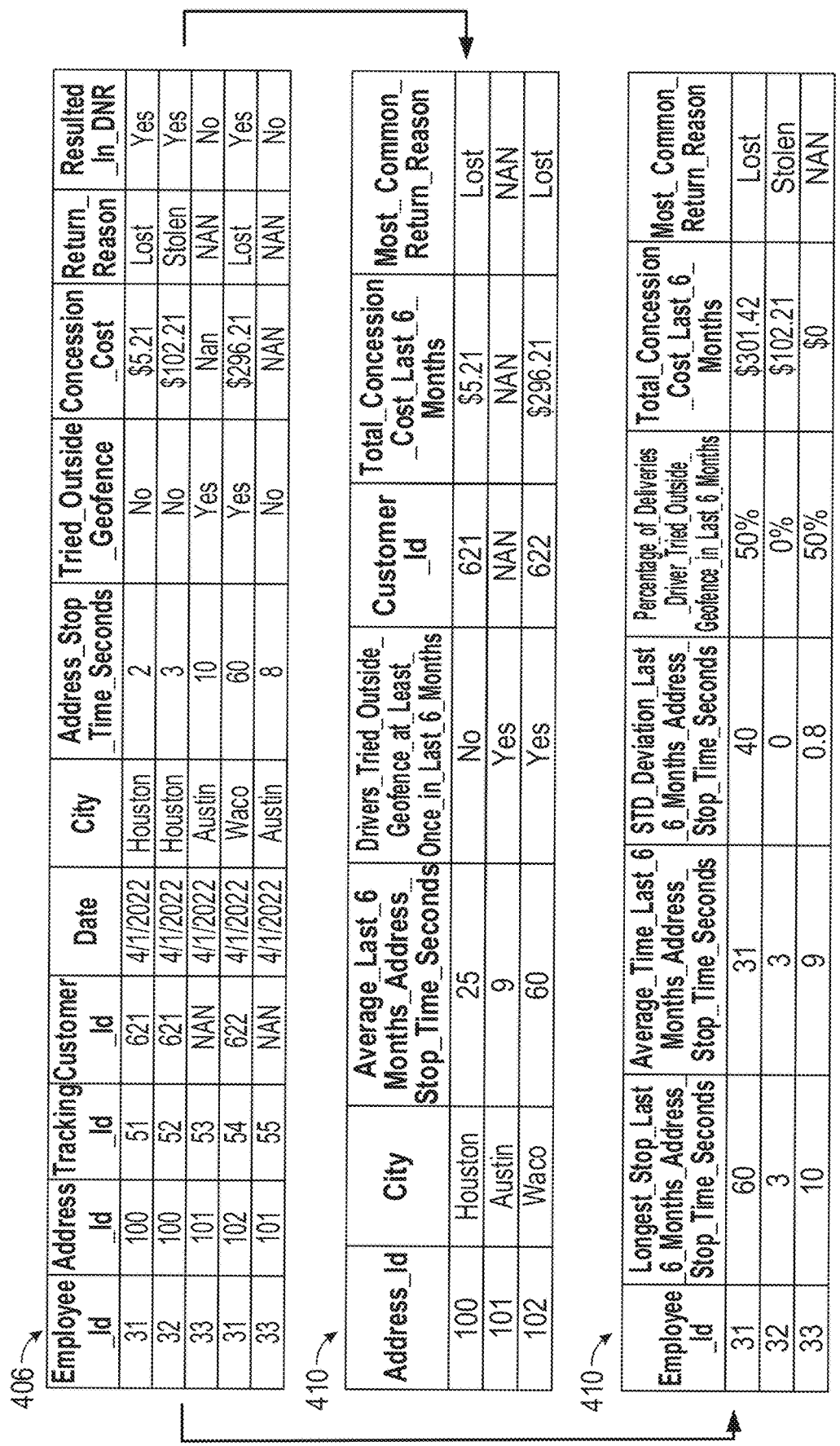

FIGS. 4A-4B provides an example of a data transformation performed on a collection of raw data (e.g., pre-transformation data) that may be obtained in the detecting stage 102. In this example, the raw data may be transformed into a standardized form that is suitable for model training, as well as real-time querying of the model. For purposes of the example, the data focuses on address information and delivery driver information. However, the same transformation process may be applied to any other types of data as well.

Beginning with FIG. 4A, a first table 402 and a second table 404 that include different types of raw data are shown. The first table 402 includes columns for a delivery driver identifier, a delivery address identifier, a delivery tracking identifier, a date, a city, an amount of time the delivery driver was stopped at an address, and an indication of whether the delivery driver attempted delivery outside of a designated geofence delivery area. The second table 404 includes columns for customer identifiers, address identifiers, tracking identifiers, shipment dates, concession costs, and a reason for any return requests.

As shown in the two tables, some of the rows may include duplicative data. For example, the first table 402 includes two rows associated with the delivery driver identifier "31" and two rows associated with the delivery driver identifier "33." The transformation process compresses this raw data into a format that reduces or eliminates these duplicative rows. Delivery driver identifiers and/or customer identifiers are just examples and the transformation process may similarly seek to reduce duplicative data rows for any other type of data. As an additional example, a raw data table may include multiple rows including a same package type and the transformation process may be used to compress the data table into a table in which each row includes a unique package type.

The first operation in the transformation stage may be to consolidate the data in the first table 402 and the second table 404 so that as much information about each delivery as possible is provided in one row. For example, if the data in the first table 402 and the second table 404 are grouped by date and then joined by the tracking identifier, then a third table 406 may be created that includes only one delivery driver per each unique row.

As shown in the third table 406, a column called "Resulted_in_DNR" has been added, which may include an entry of "yes" if a tracking identifier was present in the first table 402 and/or the second table 404. This column may be the target or prediction column when training a model (such as a machine learning model or any other model) to predict delivered but not received (DNR) delivery defects in this example. The "date" column may be used for train and/or test splitting the data for training the model. The "date" columns may be used to ensure that the data is organized such that only past information is associated with a delivery so that the model learns to make predictions based on past information. This transform alone may not be sufficient to meet the requirements of the data transformation stage 204, however. If a user wanted to retrieve information about a past address or transporter, the query may result in multiple rows returned. This behavior results in the query latency and query result size being unpredictable. To mitigate this, the data may be further refined so that query responses are a fixed data size.

Turning to FIG. 4B, the table 406 is further transformed such that the information for a single historical delivery occupies a single row. To further distill the data in this example, another transformation may be performed. This second transform may condense several pieces of information (e.g., rows) into a single row value. For example, the "tried_outside_geofence" column may include either a "yes" or a "no" for each delivery in the third table 406. If this information is to be represented per driver, this information may summarize all of the deliveries made by that driver in a given time period using a mathematical operation that conserves the maximum amount of useful signal. In this case, an analysis has shown that getting the percentage of times the driver has delivered outside of geofence in the last six months preserves most of the signal for DNR while distilling the information into a single row.

The final dataset may then be provided to a database (for example database 230 shown in FIG. 2 and/or any other database) that may be configured to efficiently handle requests for the model to determine the likelihood that a given delivery or set of deliveries may include one or more delivery defects. For example, the model may be configured to produce outputs in less than a second to handle real-time requests prior to such deliveries taking place. FIG. 4B shows that the final example dataset (shown in the fourth table 408 and the fifth table 410) has only one row per address or transporter. This results in only one record being returned per query, ensuring a predictable query time and response size. It should be noted that the specific manner in which the original first table 402 and second table 404 are transformed into the fourth table 408 and/or the fifth table 410 is merely exemplary.

FIG. 5 illustrates an example flow diagram 500 in accordance with one or more example embodiments of the disclosure. Particularly, the flow diagram 500 illustrates high-level operations associated with the first portion (e.g., data extraction) of the data transformation stage 104 described with respect to FIG. 1. Operation 502 involves receiving one or more different types of data. As an example, the figure shows data including road events, delivery driver history, delivery driver performance, address information, address did not receive history, customer information, weather information, and/or any other types of information. In one or more embodiments, the data may be received in the form of multiple data tables. In operation 504, the multiple data tables may be consolidated into a single data table. In one or more embodiments, the data table may be stored in a bucket associated with an object storage service. However, the data may be stored and provided to the database in any other form as well. At operation 506, the consolidated data may then be provided to a database for storage (for example, the database 230).

Figure 6:
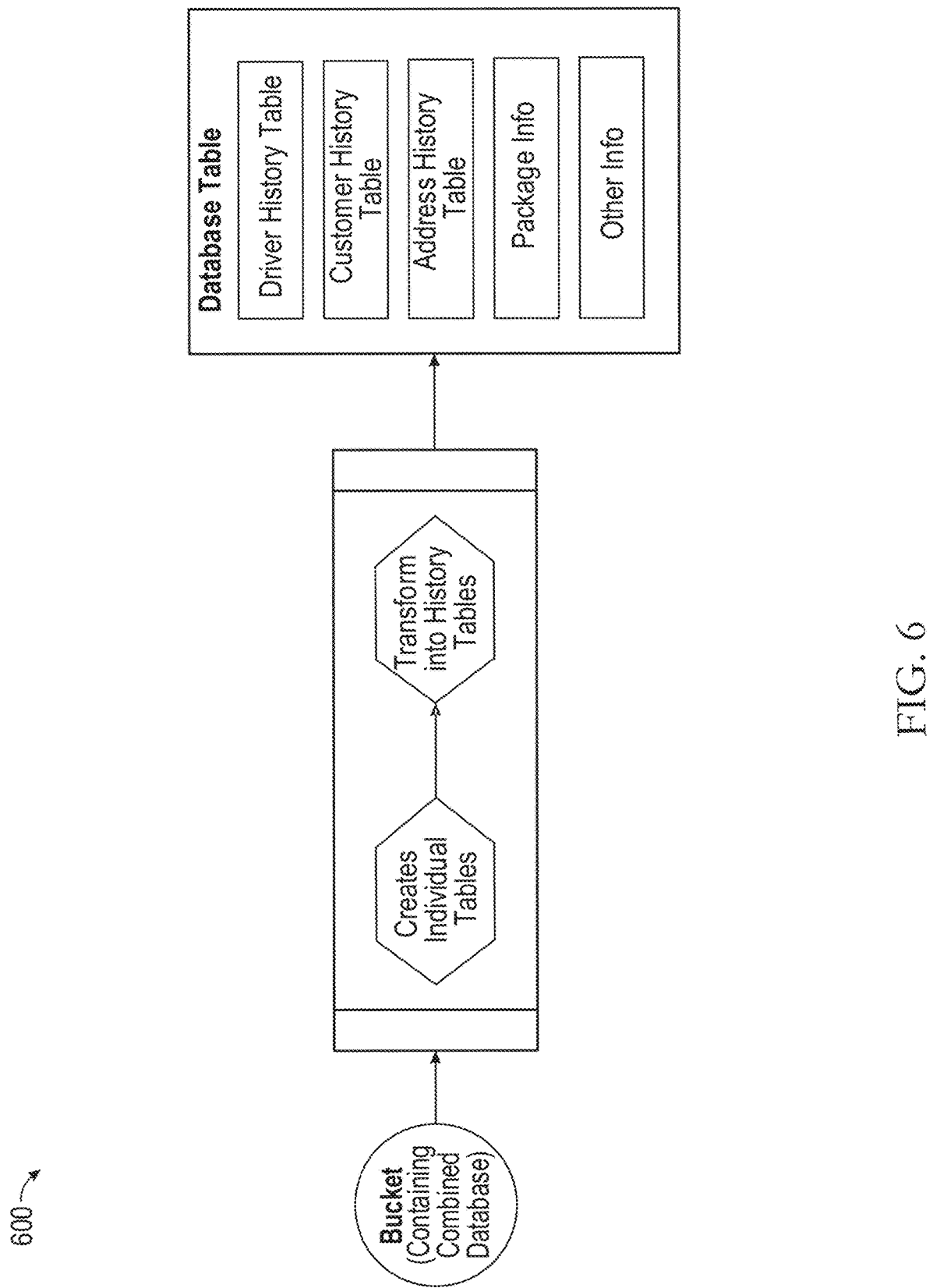
FIG. 6 illustrates another example flow diagram for a data transformation stage in accordance with one or more example embodiments of the disclosure.

FIG. 6 illustrates an example flow diagram 600 in accordance with one or more example embodiments of the disclosure. Particularly, the flow diagram 600 illustrates high-level operations associated with the first portion (e.g., data transformation) of the data transformation stage 104 described with respect to FIG. 1. After gathering all relevant historical data, the combined dataset provided in the bucket may have a fixed number of features, but an unknown number of historical examples. Although predictions may be made from varying amounts of data, most prediction algorithms require a fixed input data size. This means that information may need to be extracted from potentially hundreds of rows of data in the tables to create a fixed-size numeric set of data that represents the histories and package information. A machine learning algorithm can learn and make real-time predictions more effectively with this distilled information.

Feature extraction may include two main goals: (1) transform n-dimensional data into a fixed dimension and (2) distill complex noisy information into more intelligible data that an algorithm can learn from. Shown below is a simplified example of how a transform job might turn raw data from an external source (e.g., shown in table 2) into a usable feature (for example, shown in table 3). This is another example of a transformation process shown in FIGS. 4A-4B. For example, each entity is condensed into one row:

TABLE 2

| Driver | Delivery Date | Delivery City | DNR-C |
|---|---|---|---|
| Driver One | Aug. 10, 2022 | Austin | yes |
| Driver One | Apr. 3, 2022 | Houston | no |
| Driver One | Jan. 20, 2022 | Dallas | no |
| Driver One | Feb. 3, 2022 | Austin | no |
| Driver Two | Aug. 10, 2022 | Austin | yes |
| Driver Two | Apr. 3, 2022 | Austin | yes |
| Driver Two | Jan. 20, 2022 | College Station | no |
| Driver Three | Feb. 3, 2022 | Austin | yes |

TABLE 3

| Driver | Citys Delivered | DNR-C Percentage |
|---|---|---|
| Driver One | 3 | 25% |
| Driver Two | 2 | 66% |
| Driver Three | 1 | 100% |

These two tables illustrate some columns from the history may be removed, while others may be aggregated into a single numeric feature for a model to ingest.

Figure 7A:
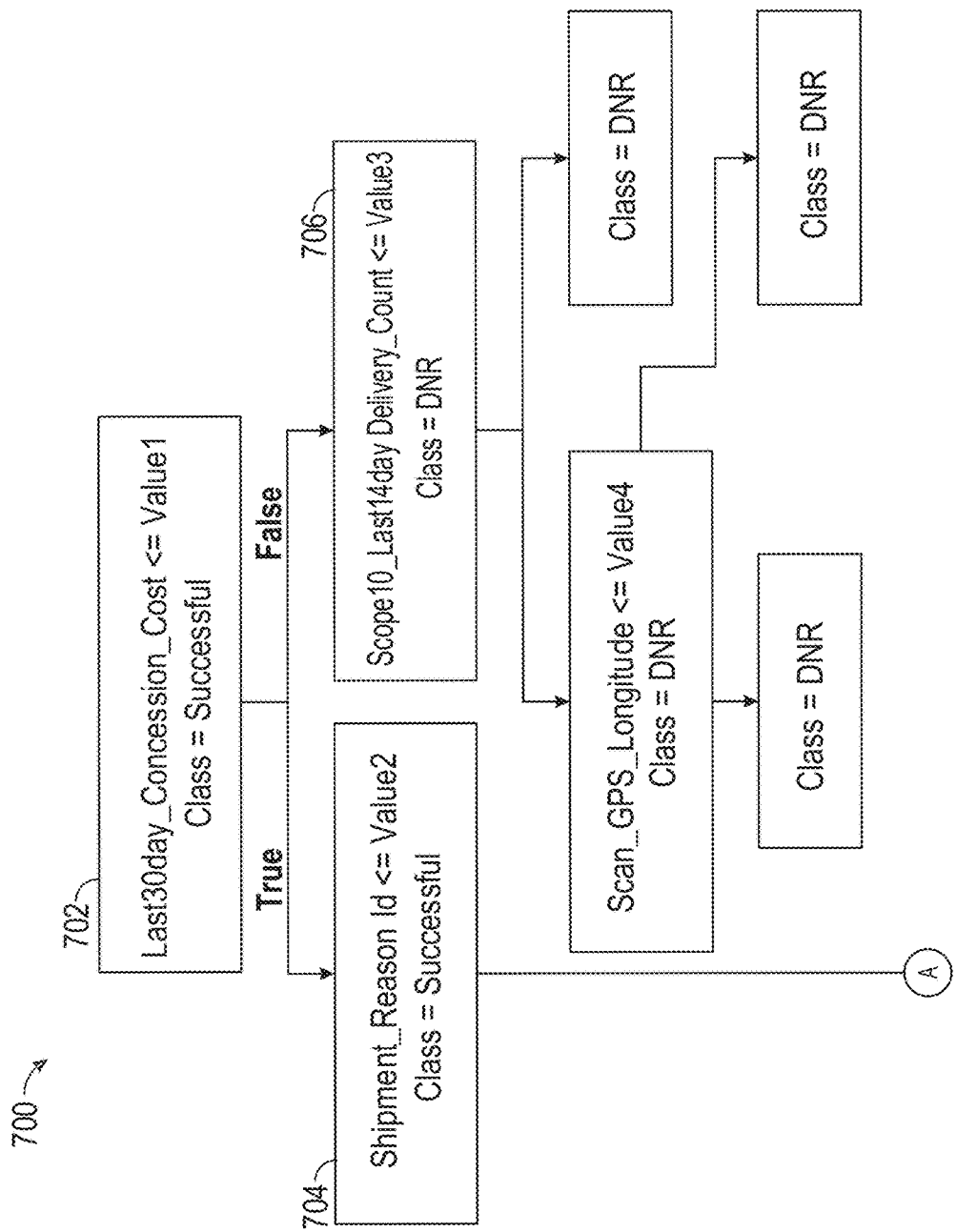
FIGS. 7A-7B illustrate an example machine learning model in accordance with one or more example embodiments of the disclosure.
Figure 7B:
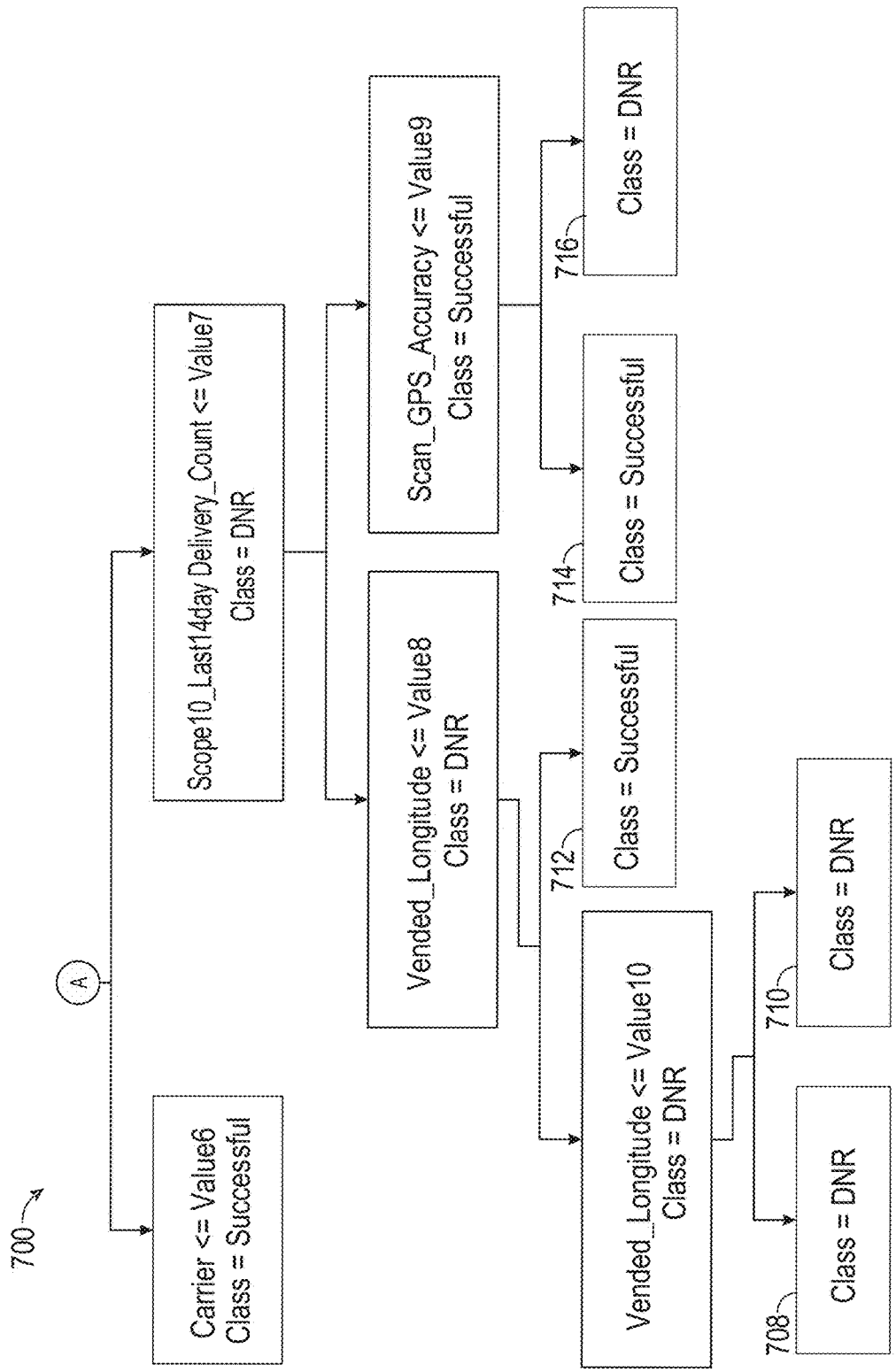

FIGS. 7A-7B illustrate an example model 700 in accordance with one or more example embodiments of the disclosure. Particularly, FIGS. 7A-7B show that the model 700 may be a machine learning model that may involve the use of a decision tree. A decision tree may be a type of supervised machine learning that may be used, for example, to solve classification problems, which is the use of a model to categorize or classify an object. Decision trees are a form of predictive modeling, which serve to map the different decisions or solutions to a given outcome. As shown in FIGS. 7A-7B, the decision tree includes a number of different nodes (for example, node 702, node 704, node 706, etc.). The root node (for example node 702) is the start of the decision tree, which may involve the whole dataset. Each of the nodes may include an associated condition. Based on the condition, the dataset may be split down two branches. This procedure may continue through all of the nodes included in the decision tree until one or more "leaf nodes" of the decision treat are reached.

Leaf nodes are the endpoint of a branch, or the final output of a series of decisions. That is, the features of the data are nodes and the outcome of the decision tree determined by the leaf node. For example, FIG. 7B shows leaf nodes 708-716. Leaf nodes 708, 710, and 716 indicate a probability of a "DNR" delivery defect type and leaf nodes 712 and 714 indicate a probability of a successful delivery (e.g., no delivery defects). It should be noted that the nodes included in the decision tree shown in FIGS. 7A-7B are merely exemplary. Any other number of nodes including any other conditions may also be used. Additionally, the final leaf nodes are also exemplary and may be implemented in any other manner as well.

The simplified decision tree algorithm shown in FIGS. 7A-7B is merely exemplary and is not intended to limit the type of machine learning model that is used to determine the probability that a delivery may result in a delivery defect. For example, a random forest algorithm that adds additional levels of complexity to the analysis may be used instead of the simplified decision tree shown in FIG. 7. In further embodiments, any other type of algorithm and/or model may also be used to determine the probability value indicating the likelihood that a delivery may result in a delivery defect (for example, any other types of machine learning models, such as a neural network, etc.).

Figure 8:
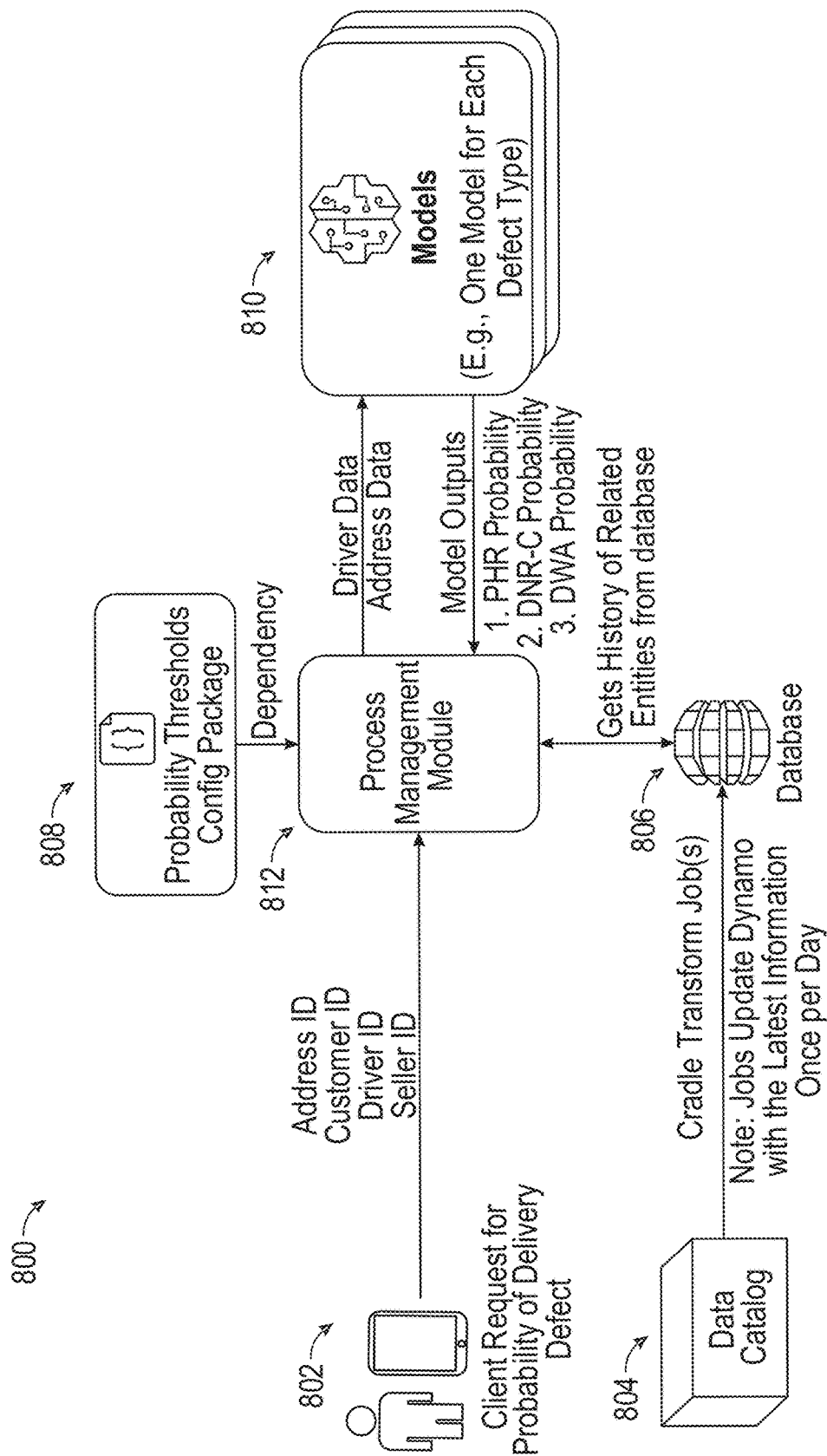
FIG. 8 illustrates an example system architecture in accordance with one or more example embodiments of the disclosure.

FIG. 8 illustrates another example system architecture 800 in accordance with one or more example embodiments of the disclosure. Particularly, FIG. 8 illustrates various operations associated with the predicting defects stage 110 described with respect to FIG. 1, which may be implemented by the various elements of the system architecture 800. The system architecture 800 may include a user device 802, a data source 804, a database 806, a probability threshold configuration package 808, one or more model(s) 810, and a process management module 812. In one or more embodiments, the elements of the system architecture 800 may also be implemented in any of the components of the system 200 as well. For example, any of the operations may be performed by the user device 202, server 220, vehicle 240, etc.

In one or more embodiments, as described with respect to FIG. 7, the model(s) 810 may involve a machine learning algorithm such as a decision tree or a random forest, for example. In some cases, each defect type may be provided its own model.

The probability thresholds configuration package 808 may store the threshold values that are used as a point of comparison with a probability output from the model(s) 810 to determine if particular guard rails should be activated or deactivated. Each model 810 that calculates probabilities may have different receiver operator characteristics and may, therefore, have unique threshold values for the associated guardrails. The way that these thresholds are calculated may depend on various factors, such as the cost of driver time for each guardrail, the percent of occurrence for each guardrail in all itineraries in a delivery region, and the predicted change in defect probability due to the guardrail being activated or deactivated. These constraints create a calculable optimization problem where the thresholds are the input variable, and the output is dollars saved.

The process orchestrator module 812 may be employed to facilitate the operations shown in FIG. 8. For example, the process orchestrator module 812 may obtain any relevant features for determining the probabilities from the database 806. These features may then be provided to the model(s) 910 to determine any probability values.

FIGS. 9A-9K illustrate an example user interface in accordance with one or more example embodiments of the disclosure.

Figure 9C:
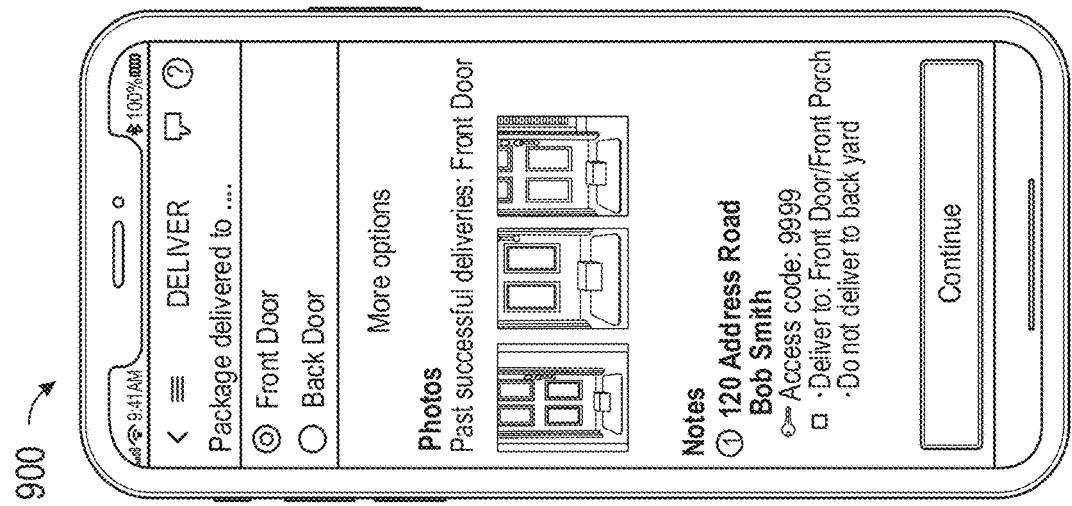
Figure 9B:
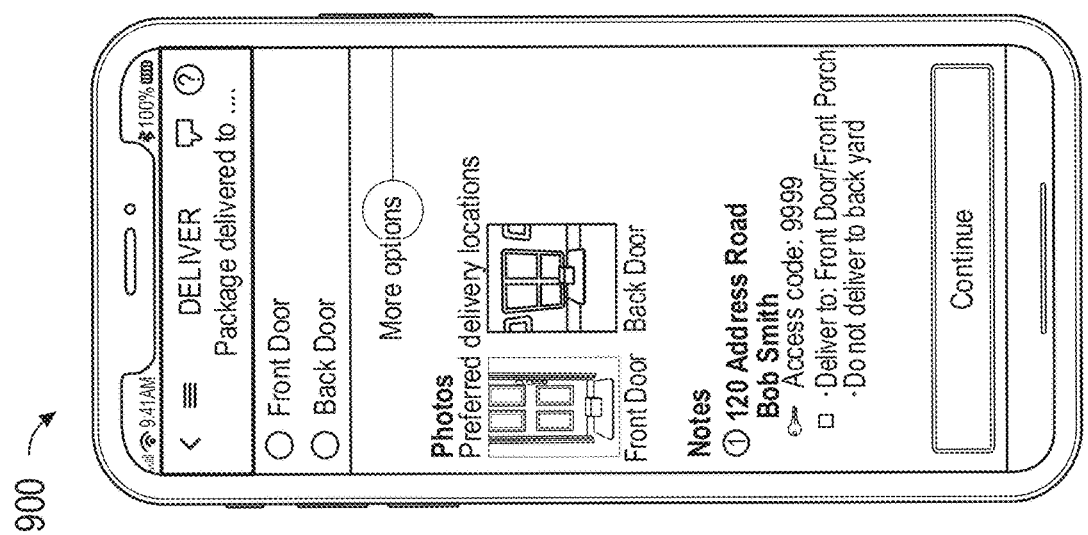
Figure 9A:
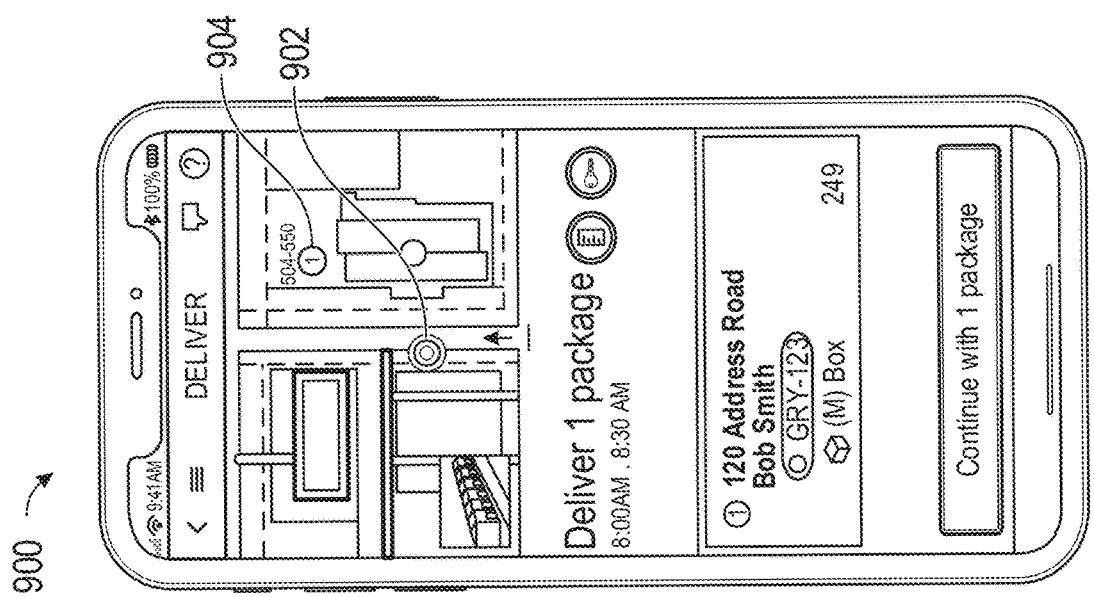

Beginning with FIGS. 9A-9F, an example of the second example guardrail described with respect to FIG. 1 is shown as being implemented in an application. FIGS. 9A-9C shows a sequence of different portions of the user interface 900 requiring a user to capture one or more photographs of a delivery location of the packages and also requiring the user to select a location of the delivery from a list of options. FIG. 9A shows a map displaying a current location 902 of the delivery driver relative to a delivery location 904. FIG. 9B shows a listing of potential delivery areas at the delivery location (for example, the figure shows a listing including "front door" and "back door"). FIG. 9C shows an example selection of the "front door" delivery area, indicating that the delivery driver intends to deliver the package to the front door of the property associated with the delivery address.

Figure 9F:
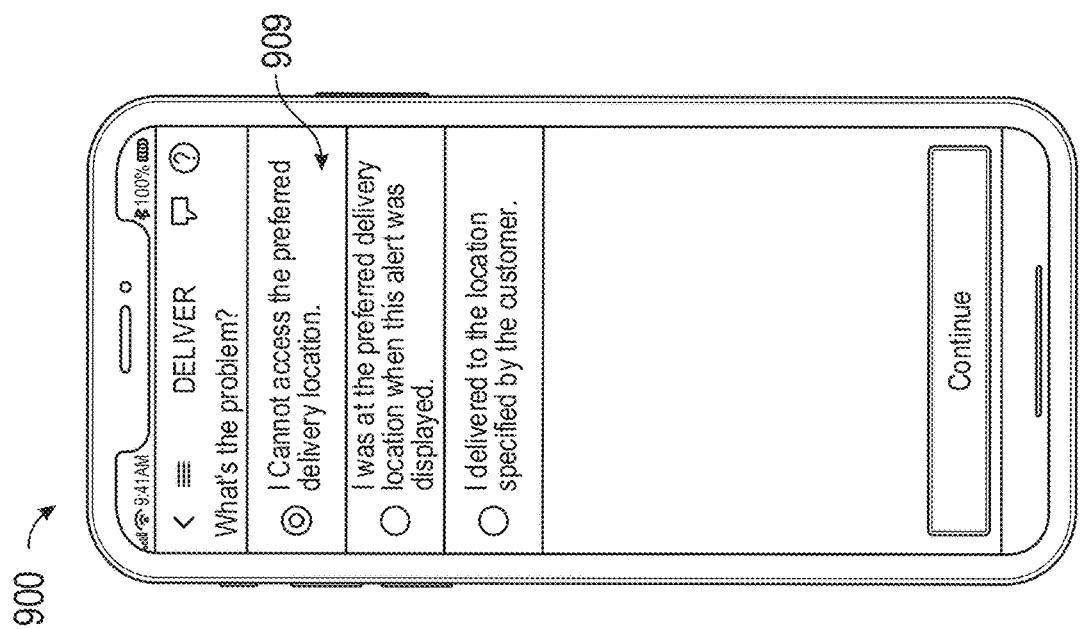
Figure 9E:
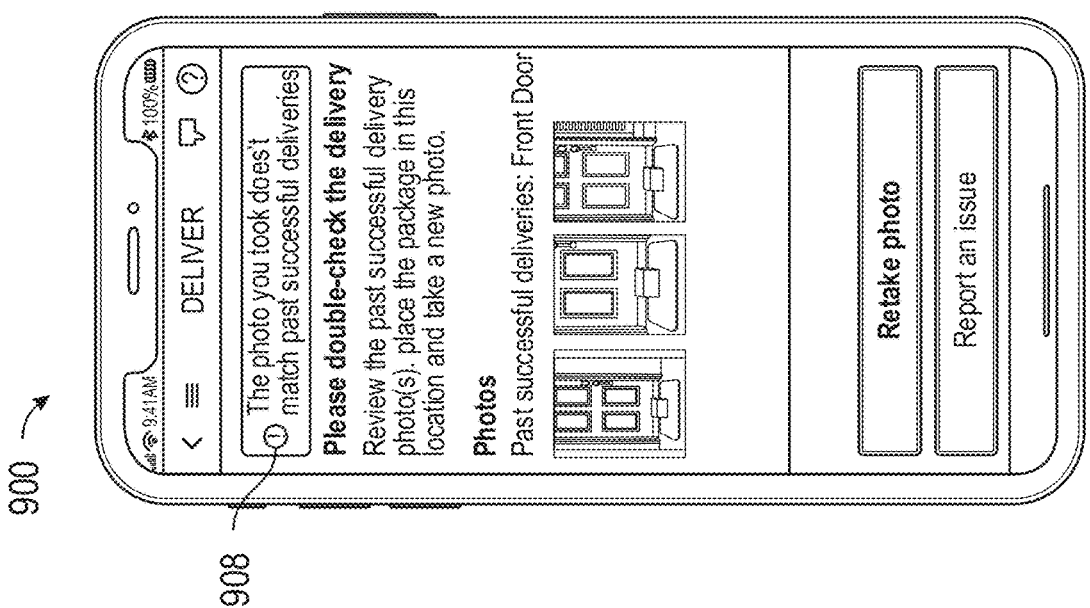
Figure 9D:
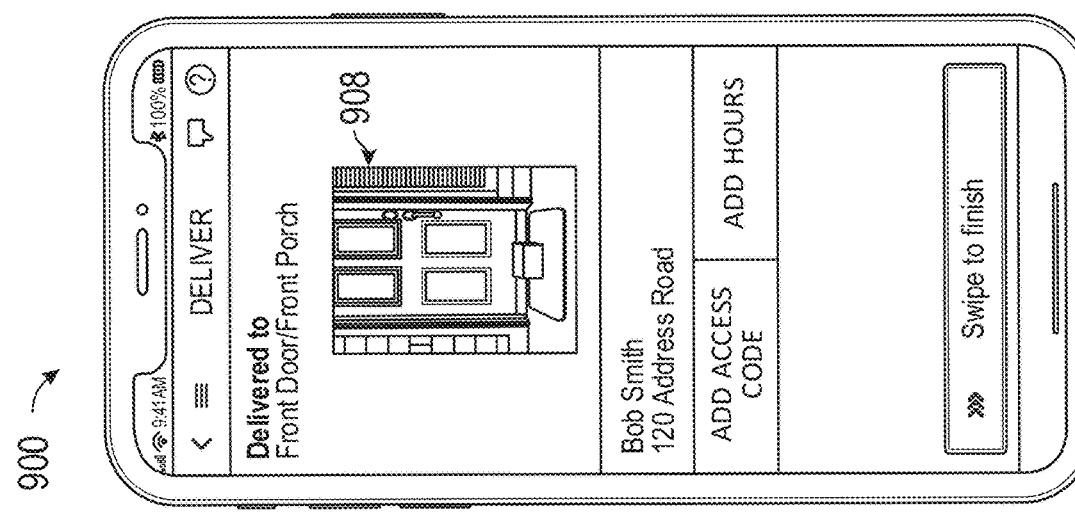
Figure 9K:
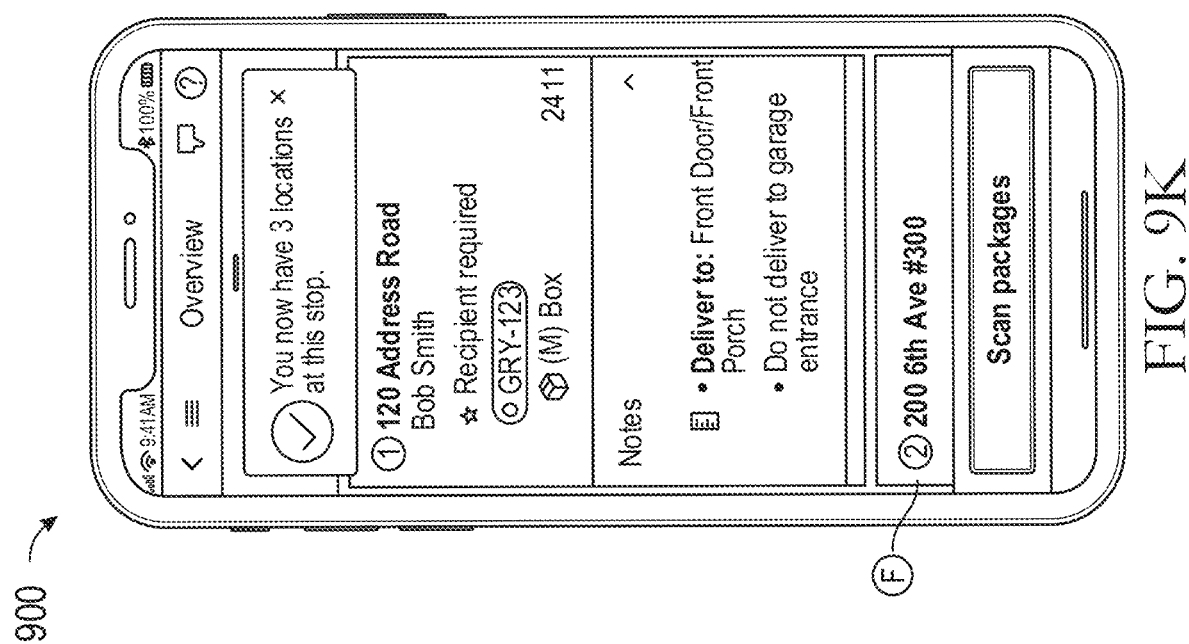

Continuing with the illustration of the second example guardrail, once the delivery driver is at the delivery location, FIG. 9D shows a photograph 908 captured by the delivery driver of the package that has been delivered to delivery area selected in FIG. 9C. The photographs are then compared to historical photographs associated with that same location. If it is determined that the photographs do not match, then the application provides an indication 910 of the failure to match (as shown in FIG. 9E). FIG. 9F also shows that the application requires the delivery driver to provide a reason for the discrepancy before completing the delivery. Specifically, the figure shows that the delivery driver is presented with a listing 909 of reasons, and the delivery driver is required to select one or more of the options in the listing 909. This second example guardrail thus requires additional actions from the delivery driver if the photographs indicate that the delivery driver may not have delivered the package to the correct area at the delivery location.

FIGS. 9C-9K shows an example of the third example guardrail described with respect to FIG. 1 being implemented in the application. FIG. 9G shows that in the pre-scan delivery screen of the application, a "manage locations" secondary button 914 is displayed. FIG. 9H shows a screen that is displayed upon selection of the manage locations secondary button 914. That is, FIG. 9H shows a listing 916 of delivery addresses that are able to be combined into a group delivery as described herein. However, high-risk deliveries are not shown as eligible delivery addresses to be selected for grouping. FIG. 9I shows a selection of one of the delivery addresses in the listing 916 to be included in the group delivery.

Figure 10:
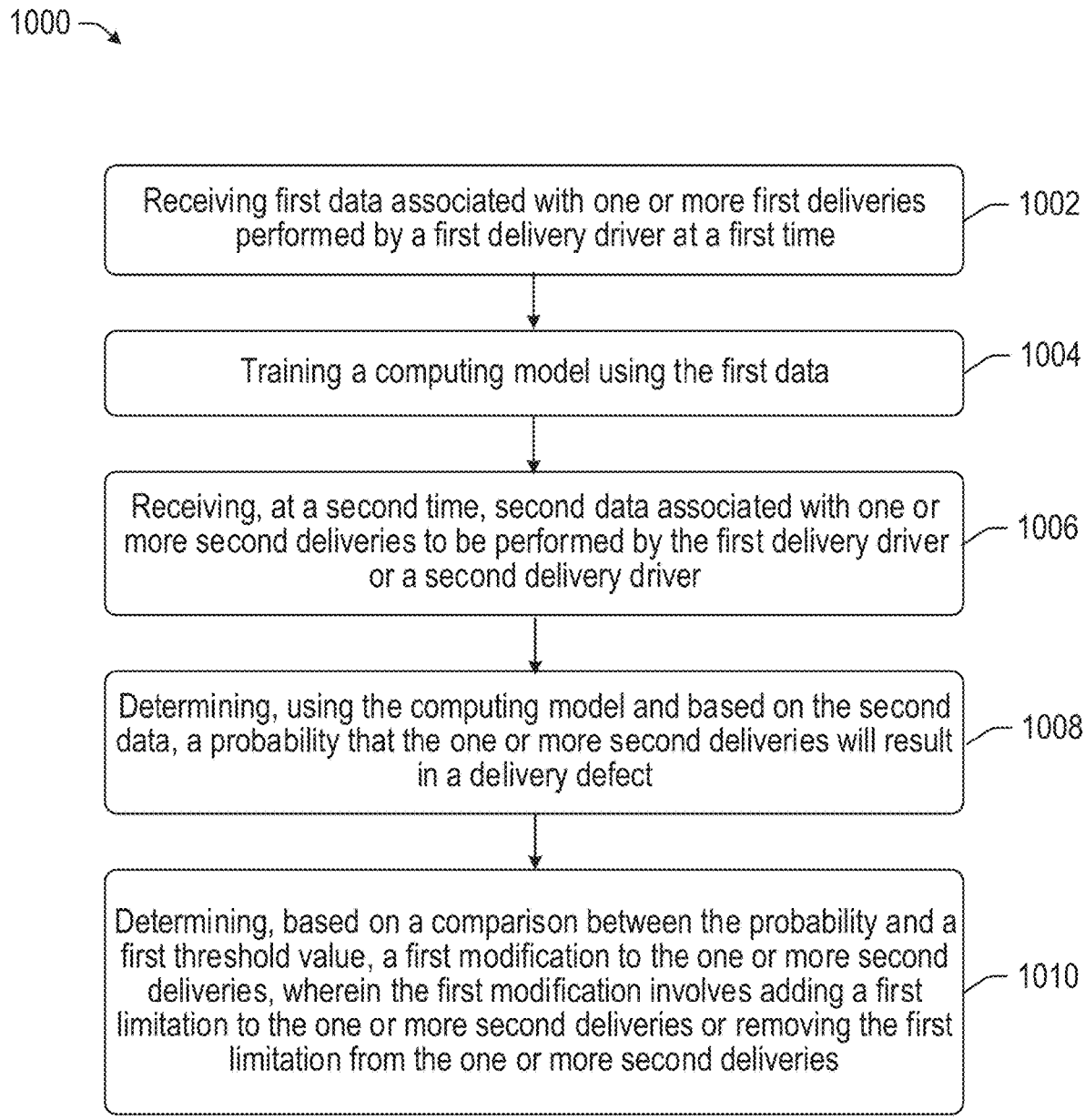
FIG. 10 is an illustration of an example method in accordance with one or more example embodiments of the disclosure.

FIG. 10 depicts an example method 1000 in accordance with one or more example embodiments of the disclosure. The method 1000 may be performed using computer-executable instructions stored on the memory of a device or system (for example, user device 202, server 220, vehicle 240, computing device 1100, and/or any other device or system described herein or otherwise).

At block 1002 of the process flow 1000, computer-executable instructions stored on the memory of a device or system may be executed to receive first data associated with one or more first deliveries performed by a first delivery driver at a first time. The first data may include any of the different types of data described herein or otherwise. For example, the data may include delivery driver data, customer data, seller data, package data, address data, environmental data, and/or any other types of data.

At block 1004 of the process flow 1000, computer-executable instructions stored on the memory of a device or system may be executed to train a computing model using the first data.

At block 1006 of the process flow 1000, computer-executable instructions stored on the memory of a device or system may be executed to receive, at a second time, second data associated with one or more second deliveries to be performed by the first delivery driver or a second delivery driver. The second data, for example, may include data associated with a delivery or set of deliveries to be performed by a delivery driver. In some instances, the data may be a delivery itinerary including deliveries to be performed by the delivery driver.

At block 1008 of the process flow 1000, computer-executable instructions stored on the memory of a device or system may be executed to determine, using the computing model and based on the second data, a probability that the one or more second deliveries will result in a delivery defect. As mentioned elsewhere herein, the model used to determine a probability that a delivery defect is likely to occur for the delivery or deliveries may be queried in real-time prior to the deliveries being performed. The model may be configured to produce the output in a short time frame (for example, within a second). In this manner, a probability value may be determined automatically for any delivery itinerary that is established for a delivery driver.

At block 1010 of the process flow 1000, computer-executable instructions stored on the memory of a device or system may be executed to determine, based on a comparison between the probability and a first threshold value, a first modification to the one or more second deliveries, wherein the first modification involves adding a first limitation to the one or more second deliveries or removing the first limitation from the one or more second deliveries. That is, based on the probability value output by the model, one or more guardrails may either be activated or deactivated in association with the deliveries. As described herein, the activation or deactivation of various guardrails may be based on a comparison between the probability value and different threshold values associated with the individual guardrails.

One or more operations of the methods, process flows, or use cases of FIGS. 1-10 may have been described above as being performed by a user device, or more specifically, by one or more program module(s), applications, or the like executing on a device. It should be appreciated, however, that any of the operations of the methods, process flows, or use cases of FIGS. 1-10 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-10 may be described in the context of the illustrative devices, it should be appreciated that such operations may be implemented in connection with numerous other device configurations.

The operations described and depicted in the illustrative methods, process flows, and use cases of FIGS. 1-10 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-10 may be performed.

Figure 11:
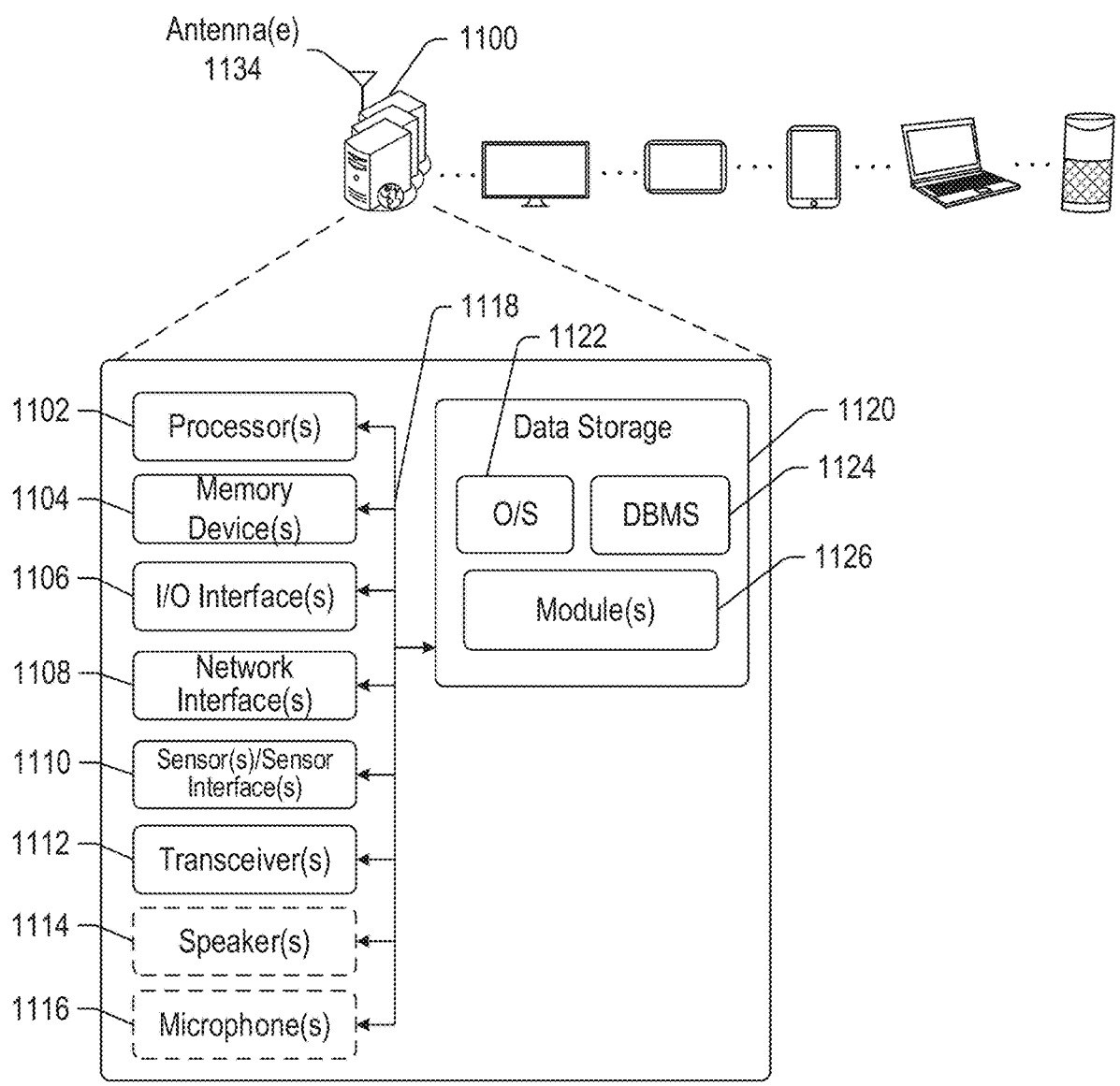
FIG. 11 is a block diagram of an illustrative computing device in accordance with one or more example embodiments of the disclosure.

FIG. 11 is a schematic block diagram of an illustrative computing device 1100 in accordance with one or more example embodiments of the disclosure. The computing device 1100 may include any suitable computing device capable of receiving and/or generating data, including, but not limited to, a mobile device such as a smartphone, tablet, e-reader, wearable device, or the like; a desktop computer; a laptop computer; a content streaming device; a set-top box; or the like. The computing device 1100 may correspond to an illustrative device configuration for the devices of FIGS. 1-11.

The computing device 1100 may be configured to communicate via one or more networks with one or more servers, search engines, user devices, or the like. In some embodiments, a single remote server or a single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 1100 may include one or more processors (processor(s)) 1102, one or more memory devices 1104 (generically referred to herein as memory 1104), one or more input/output (I/O) interface(s) 1106, one or more network interface(s) 1108, one or more sensors or sensor interface(s) 1110, one or more transceivers 1112, one or more optional speakers 1114, one or more optional microphones 1116, and data storage 1120. The computing device 1100 may further include one or more buses 1118 that functionally couple various components of the computing device 1100. The computing device 1100 may further include one or more antenna (e) 1134 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1118 may include at least one of a system bus, the memory bus, an address bus, or a message bus, and may permit exchange of information (e.g., data (including computer-executable code), signaling, etc.) between various components of the computing device 1100. The bus(es) 1118 may include, without limitation, the memory bus or the memory controller, a peripheral bus, an accelerated graphics port, and so forth. The bus(es) 1118 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1104 of the computing device 1100 may include volatile memory (memory that maintains its state when supplied with power) such as random-access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1104 may include multiple different types of memory such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 1104 may include main memory as well as various forms of cache memory such as instruction cache(s), data cache(s), translation lookaside buffer(s) (TLBs), and so forth. Further, cache memory, such as a data cache, may be a multi-level cache organized as a hierarchy of one or more cache levels (L1, L2, etc.).

The data storage 1120 may include removable storage and/or non-removable storage including, but not limited to, magnetic storage, optical disk storage, and/or tape storage. The data storage 1120 may provide non-volatile storage of computer-executable instructions and other data. The memory 1104 and the data storage 1120, removable and/or non-removable, are examples of computer-readable storage media (CRSM) as that term is used herein.

The data storage 1120 may store computer-executable code, instructions, or the like that may be loadable into the memory 1104 and executable by the processor(s) 1102 to cause the processor(s) 1102 to perform or initiate various operations. The data storage 1120 may additionally store data that may be copied to memory 1104 for use by the processor(s) 1102 during the execution of the computer-executable instructions. Moreover, output data generated as a result of execution of the computer-executable instructions by the processor(s) 1102 may be stored initially in memory 1104, and may ultimately be copied to data storage 1120 for non-volatile storage.

More specifically, the data storage 1120 may store one or more operating systems (O/S) 1122; one or more database management systems (DBMS) 1124; and one or more program module(s), applications, engines, computer-executable code, scripts, or the like such as, for example, one or more module(s) 1126. Some or all of these module(s) may be sub-module(s). Any of the components depicted as being stored in data storage 1120 may include any combination of software, firmware, and/or hardware. The software and/or firmware may include computer-executable code, instructions, or the like that may be loaded into the memory 1104 for execution by one or more of the processor(s) 1102. Any of the components depicted as being stored in data storage 1120 may support the functionality described in reference to correspondingly named components earlier in this disclosure.

The data storage 1120 may further store various types of data utilized by components of the computing device 1100. Any data stored in the data storage 1120 may be loaded into the memory 1104 for use by the processor(s) 1102 in executing computer-executable code. In addition, any data depicted as being stored in the data storage 1120 may potentially be stored in one or more datastore(s) and may be accessed via the DBMS 1124 and loaded in the memory 1104 for use by the processor(s) 1102 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 11, the datastore(s) may include, for example, purchase history information, user action information, user profile information, a database linking search queries and user actions, and other information.

The processor(s) 1102 may be configured to access the memory 1104 and execute computer-executable instructions loaded therein. For example, the processor(s) 1102 may be configured to execute computer-executable instructions of the various program module(s), applications, engines, or the like of the computing device 1100 to cause or facilitate various operations to be performed in accordance with one or more embodiments of the disclosure. The processor(s) 1102 may include any suitable processing unit capable of accepting data as input, processing the input data in accordance with stored computer-executable instructions, and generating output data. The processor(s) 1102 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application-Specific Integrated Circuit (ASIC), a Field-Programmable Gate Array (FPGA), a System-on-a-Chip (SoC), a digital signal processor (DSP), and so forth. Further, the processor(s) 1102 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1102 may be capable of supporting any of a variety of instruction sets.

Referring now to functionality supported by the various program module(s) depicted in FIG. 11, the module(s) 1126 may include computer-executable instructions, code, or the like that responsive to execution by one or more of the processor(s) 1102 may perform functions including, but not limited to, performing any functionality associated with the prediction model as described herein, and the like.

Referring now to other illustrative components depicted as being stored in the data storage 1120, the O/S 1122 may be loaded from the data storage 1120 into the memory 1104 and may provide an interface between other application software executing on the computing device 1100 and the hardware resources of the computing device 1100. More specifically, the O/S 1122 may include a set of computer-executable instructions for managing the hardware resources of the computing device 1100 and for providing common services to other application programs (e.g., managing memory allocation among various application programs). In certain example embodiments, the O/S 1122 may control execution of the other program module(s) to dynamically enhance characters for content rendering. The O/S 1122 may include any operating system now known or which may be developed in the future, including, but not limited to, any server operating system, any mainframe operating system, or any other proprietary or non-proprietary operating system.

The DBMS 1124 may be loaded into the memory 1104 and may support functionality for accessing, retrieving, storing, and/or manipulating data stored in the memory 1104 and/or data stored in the data storage 1120. The DBMS 1124 may use any of a variety of database models (e.g., relational model, object model, etc.) and may support any of a variety of query languages. The DBMS 1124 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 1100 is a mobile device, the DBMS 1124 may be any suitable lightweight DBMS optimized for performance on a mobile device.

Referring now to other illustrative components of the computing device 1100, the input/output (I/O) interface(s) 1106 may facilitate the receipt of input information by the computing device 1100 from one or more I/O devices as well as the output of information from the computing device 1100 to the one or more I/O devices. The I/O devices may include any of a variety of components, such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 1100 or may be separate. The I/O devices may further include, for example, any number of peripheral devices such as data storage devices, printing devices, and so forth.

The I/O interface(s) 1106 may also include an interface for an external peripheral device connection such as universal serial bus (USB), FireWire, Thunderbolt, Ethernet port, or other connection protocol that may connect to one or more networks. The I/O interface(s) 1106 may also include a connection to one or more of the antenna (e) 1134 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 1100 may further include one or more network interface(s) 1108 via which the computing device 1100 may communicate with any of a variety of other systems, platforms, networks, devices, and so forth. The network interface(s) 1108 may enable communication, for example, with one or more wireless routers, one or more host servers, one or more web servers, and the like via one or more of networks.

The antenna (e) 1134 may include any suitable type of antenna depending, for example, on the communications protocols used to transmit or receive signals via the antenna (e) 1134. Non-limiting examples of suitable antennas may include directional antennas, non-directional antennas, dipole antennas, folded dipole antennas, patch antennas, multiple-input multiple-output (MIMO) antennas, or the like. The antenna (e) 1134 may be communicatively coupled to one or more transceivers 1112 or radio components to which or from which signals may be transmitted or received.

As previously described, the antenna (e) 1134 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 1134 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g. 802.11n), 5 GHz channels (e.g., 802.11n, 802.11ac), or 60 GHz channels (e.g., 802.11ad). In alternative example embodiments, the antenna (e) 1134 may be configured to transmit or receive radio frequency signals within any suitable frequency range forming part of the unlicensed portion of the radio spectrum.

The antenna (e) 1134 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1112 may include any suitable radio component(s) for—in cooperation with the antenna (c) 1134-transmitting or receiving radio frequency (RF) signals in the bandwidth and/or channels corresponding to the communications protocols utilized by the computing device 1100 to communicate with other devices. The transceiver(s) 1112 may include hardware, software, and/or firmware for modulating, transmitting, or receiving—potentially in cooperation with any of antenna (c) 1134—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1112 may further include hardware, firmware, or software for receiving GNSS signals. The transceiver(s) 1112 may include any known receiver and baseband suitable for communicating via the communications protocols utilized by the computing device 1100. The transceiver(s) 1112 may further include a low noise amplifier (LNA), additional signal amplifiers, an analog-to-digital (A/D) converter, one or more buffers, a digital baseband, or the like.

The sensor(s)/sensor interface(s) 1110 may include or may be capable of interfacing with any suitable type of sensing device, such as, for example, inertial sensors, force sensors, thermal sensors, and so forth. Example types of inertial sensors may include accelerometers (e.g., MEMS-based accelerometers), gyroscopes, and so forth.

The optional speaker(s) 1114 may be any device configured to generate audible sound. The optional microphone(s) 1116 may be any device configured to receive analog sound input or voice data.

It should be appreciated that the program module(s), applications, computer-executable instructions, code, or the like depicted in FIG. 11 as being stored in the data storage 1120 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 1100 and/or hosted on other computing device(s) accessible via one or more networks, may be provided to support functionality provided by the program module(s), applications, or computer-executable code depicted in FIG. 11 and/or additional or alternate functionality. Further, functionality may be modularized differently such that processing described as being supported collectively by the collection of program module(s) depicted in FIG. 11 may be performed by a fewer or greater number of module(s) or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 11 may be implemented, at least partially, in hardware and/or firmware across any number of devices.

It should further be appreciated that the computing device 1100 may include alternate and/or additional hardware, software, or firmware components beyond those described or depicted without departing from the scope of the disclosure. More particularly, it should be appreciated that software, firmware, or hardware components depicted as forming part of the computing device 1100 are merely illustrative and that some components may not be present or additional components may be provided in various embodiments. While various illustrative program module(s) have been depicted and described as software module(s) stored in data storage 1120, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software components without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines, and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machines, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that, upon execution, may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
 receiving first data associated with one or more first deliveries performed by a first delivery driver at a first time;
 training a computing model including a decision tree using the first data;
 receiving, at a second time, a delivery itinerary including one or more second deliveries to be performed by the first delivery driver or a second delivery driver;
 receiving second data associated with the one or more second deliveries, the second data including delivery driver data, customer data, address data, delivery package data, seller data, and environmental data, wherein the second data comprises a first data table that includes a data row including a first identifier and a second data row also including the first identifier;
 performing a first data transformation on the first data table to generate a second data table including a single data row including the first identifier;
 performing a second data transformation on the second data table such that a single historical delivery occupies a single row of the second data table, wherein the second data transformation involves removing a first column from the first data table and aggregating a second column and a third column including non-numerical values into a different column type including numerical values;

determining, in real-time, using the computing model, and based on the delivery itinerary and the second data, a probability that the one or more second deliveries will result in a delivery defect, wherein the delivery defect includes at least one of: a package that is delivered but not received by a customer, a package that is delivered to an incorrect address, or a failure to satisfy a customer delivery request;

determining, based on the probability being greater than a first threshold value, a first modification to a first delivery parameter for the one or more second deliveries, wherein the first modification involves adding a first limitation to the one or more second deliveries; and presenting the first limitation through a user interface of a mobile device application used by the first delivery driver or the second delivery driver to perform the one or more second deliveries.

2. The method of claim 1, further comprising:

determining, based on the probability being greater than a second threshold value, a second modification to a second delivery parameter for the one or more second deliveries, wherein the second modification involves adding a second limitation to the one or more second deliveries, wherein the first threshold value is different than the second threshold value.

3. The method of claim 1, further comprising:

receiving third data associated with one or more third deliveries to be performed by the first delivery driver or the second delivery driver; and determining, using the computing model and based on the third data, a second modification to a delivery parameter for the one or more third deliveries, wherein the second modification involves removing a limitation to the one or more third deliveries.

4. A method comprising:

receiving first data associated with one or more first deliveries performed by a first delivery driver at a first time;

training a computing model using the first data;

receiving, at a second time, second data associated with one or more second deliveries to be performed by the first delivery driver or a second delivery driver, wherein the second data comprises a first data table that includes a data row including a first identifier and a second data row also including the first identifier;

performing a first data transformation on the first data table to generate a second data table including a single data row including the first identifier;

performing a second data transformation on the second data table such that a single historical delivery occupies a single row of the second data table, wherein the second data transformation involves removing a first column from the first data table and aggregating a second column and a third column including non-numerical values into a different column type including numerical values;

determining, using the computing model, based on the second data, and in real-time, a probability that the one or more second deliveries will result in a delivery defect; and determining, based on a comparison between the probability and a first threshold value and in real-time, a first modification to the one or more second deliveries, wherein the first modification involves adding a first limitation to the one or more second deliveries or removing the first limitation from the one or more second deliveries.

5. The method of claim 4, further comprising:

determining, based on a comparison between the probability and a second threshold value, a second modification to the one or more second deliveries, wherein the second modification involves adding a second limitation to the one or more second deliveries or removing the second limitation from the one or more second deliveries, wherein the first threshold value is different than the second threshold value.

6. The method of claim 4, further comprising:

receiving third data associated with one or more third deliveries to be performed by a third delivery driver, the third data including data associated with the third delivery driver; and determining, using the computing model and based on the data associated with the third delivery driver, a third modification to the one or more third deliveries, wherein the third modification involves adding a third limitation to the one or more third deliveries or removing the third limitation from the one or more third deliveries.

7. The method of claim 4, wherein the second data further includes at least one of: delivery driver data, customer data, address data, delivery package data, seller data, and environmental data.

8. The method of claim 4, further comprising:

modifying a user interface of a mobile device application used by the first delivery driver or the second delivery driver to perform the one or more second deliveries to prevent the first delivery driver or the second delivery driver from accessing a function of the mobile device application.

9. The method of claim 4, wherein the first limitation includes at least one of:

reducing a size of a geofence associated with the one or more second deliveries, requiring a customer signature, providing a notification to a delivery driver, and removing an option for a group delivery.

10. A system comprising:

memory that stores computer-executable instructions; and one or more processors configured to access the memory and execute the computer-executable instructions to:

receive first data associated with one or more first deliveries performed by a first delivery driver at a first time;

train a computing model using the first data;

receive, at a second time, second data associated with one or more second deliveries to be performed by the first delivery driver or a second delivery driver, wherein the second data comprises a first data table that includes a data row including a first identifier and a second data row also including the first identifier;

perform a first data transformation on the first data table to generate a second data table including a single data row including the first identifier;

perform a second data transformation on the second data table such that a single historical delivery occupies a single row of the second data table, wherein the second data transformation involves removing a first column from the first data table and aggregating a second column and a third column including non-numerical values into a different column type including numerical values;

determine, using the computing model, based on the second data, and in real-time, a probability that the one or more second deliveries will result in a delivery defect; and determine, based on a comparison between the probability and a first threshold value and in real-time, a first modification to the one or more second deliveries, wherein the first modification involves adding a first limitation to the one or more second deliveries or removing the first limitation from the one or more second deliveries.

11. The system of claim 10, wherein the one or more processors are further configured to execute the computer-executable instructions to:
determine, based on a comparison between the probability and a second threshold value, a second modification to the one or more second deliveries, wherein the second modification involves adding a second limitation to the one or more second deliveries, wherein the first threshold value is different than the second threshold value or removing the second limitation from the one or more second deliveries.

12. The system of claim 10, wherein the one or more processors are further configured to execute the computer-executable instructions to:
receive third data associated with one or more third deliveries to be performed by a third delivery driver, the third data including data associated with the third delivery driver; and
determine, using the computing model and based on the data associated with the third delivery driver, a third modification to the one or more third deliveries, wherein the third modification involves adding a third limitation to the one or more third deliveries or removing the third limitation from the one or more third deliveries.

13. The system of claim 10, wherein the second data further includes at least one of: delivery driver data, customer data, address data, delivery package data, seller data, and environmental data.

14. The system of claim 10, wherein the one or more processors are further configured to execute the computer-executable instructions to:
present the first limitation through a user interface of a mobile device application used by the first delivery driver or the second delivery driver to perform the one or more second deliveries.

15. The system of claim 10, wherein the first limitation includes at least one of: reducing a size of a geofence associated with the one or more second deliveries, requiring a customer signature, providing a notification to a delivery driver, and removing an option for a group delivery.

16. The method of claim 4, wherein the second data table is a fixed size.

* * * * *